United States Patent
Mellot

(10) Patent No.: US 11,971,505 B2
(45) Date of Patent: Apr. 30, 2024

(54) METHODS AND DEVICES FOR PEAK SIGNAL DETECTION

(71) Applicant: STMicroelectronics (Grenoble 2) SAS, Grenoble (FR)

(72) Inventor: Pascal Mellot, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 594 days.

(21) Appl. No.: 17/107,313

(22) Filed: Nov. 30, 2020

(65) Prior Publication Data
US 2022/0171036 A1    Jun. 2, 2022

(51) Int. Cl.
G01S 7/4865    (2020.01)
G01S 7/487     (2006.01)
G01S 17/10     (2020.01)

(52) U.S. Cl.
CPC ............ G01S 7/4865 (2013.01); G01S 7/487 (2013.01); G01S 17/10 (2013.01)

(58) Field of Classification Search
CPC ......... G01S 7/4865; G01S 7/487; G01S 17/10
See application file for complete search history.

(56) References Cited

U.S. PATENT DOCUMENTS

| | | | |
|---|---|---|---|
| 11,555,901 B2 * | 1/2023 | Bolatkale | G01S 17/931 |
| 2017/0052065 A1 * | 2/2017 | Sharma | G01S 17/18 |
| 2018/0128921 A1 * | 5/2018 | Mattioli Della Rocca | G01S 17/32 |
| 2019/0049243 A1 * | 2/2019 | Jung | H01L 31/02027 |
| 2020/0203392 A1 * | 7/2020 | Sadhu | G06T 7/521 |
| 2021/0199802 A1 * | 7/2021 | Mautner | G01S 7/487 |
| 2021/0302553 A1 * | 9/2021 | Palubiak | G01S 7/4816 |
| 2022/0166516 A1 * | 5/2022 | Schultz | H04N 25/772 |
| 2022/0166948 A1 * | 5/2022 | Kelly | H04N 23/56 |

OTHER PUBLICATIONS

Vornicu, I et al. "Compact Real-Time InterFrame Histogram Builder for 15-Bits High-Speed ToF-Imagers Based on Single-Photon Detection", IEEE Sensors Journal, 19(6), pp. 2181-2190 (Year: 2019).*

* cited by examiner

*Primary Examiner* — Isam A Alsomiri
*Assistant Examiner* — Joseph C Fritchman
(74) *Attorney, Agent, or Firm* — Slater Matsil, LLP

(57) ABSTRACT

A method includes counting a first set of photons having times of flight that falls within a first time range and being detected during a first time period, determining a second time range based on the first set of photons, the second time range being smaller than the first time range, counting a second set of photons having times of flight that fall within the second time range and being detected during a second time period, and determining a third time range based on the second set of photons, the third time range being smaller than the second time range.

26 Claims, 20 Drawing Sheets

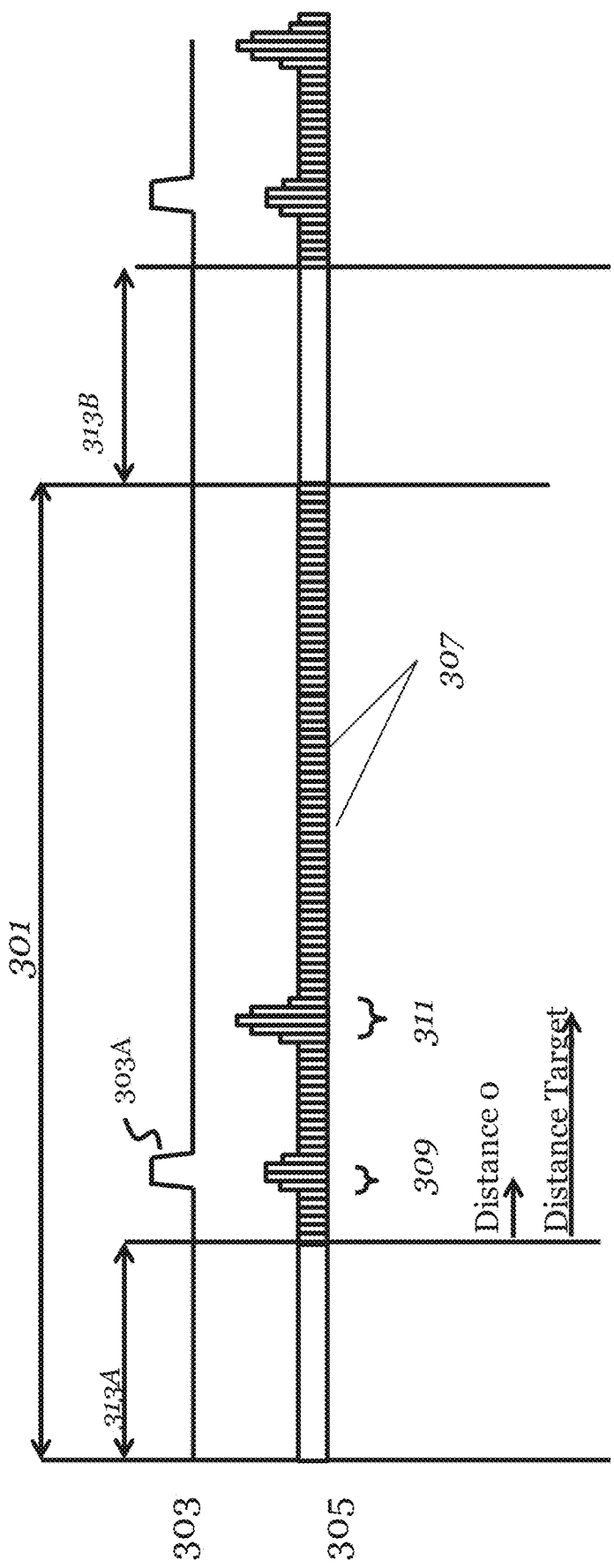

METHODS AND DEVICES FOR PEAK SIGNAL DETECTION

TECHNICAL FIELD

This application relates to methods and devices for peak signal detection.

BACKGROUND

Systems and devices utilizing Time-of-Flight techniques can provide information about the depth of an object in a three-dimensional environment. This may require projecting an optical pulse into a three-dimensional environment and counting the photons reflected back from a target. The temporal sampling window for each pixel of a Time-of-Flight system may be divided into hundreds of bins. Processing this large amount of information may be computationally expensive. And, size constraints may make hardware solutions challenging. Trimming the amount of data needed for processing Time-of-Flight information may improve the efficiency of Time-of-Flight systems and methods

SUMMARY

In accordance with an embodiment, a method includes: counting a first set of photons having times of flight that fall within a first time range and being detected during a first time period, the first set of photons being emitted by a first series of optical pulses, each optical pulse of the first series of optical pulses having a first duration; determining a second time range based on the first set of photons, the second time range being smaller than the first time range; counting a second set of photons having times of flight that fall within the second time range and being detected during a second time period, the second set of photons being emitted by a second series of optical pulses, each optical pulse of the second series of optical pulses having a second duration that is less than the first duration; and determining a third time range based on the second set of photons, the third time range being smaller than the second time range.

In accordance with an embodiment, a method includes: detecting a first set of photons having times of flight that fall within a first time range during a first time period, the first set of photons being emitted by a first series of optical pulses, each optical pulse of the first series of optical pulses having a first duration and the first set of photons being reflected from an object; grouping the photons of the first set of photons depending on times of flight of the photons of the first set of photons; determining a second time range based on the grouping of the photons of the first set of photons, the second time range being smaller than the first time range; detecting a second set of photons having times of flight that fall within the second time range during a second time period, the second set of photons being emitted by a second series of optical pulses, each optical pulse of the second series of optical pulses having a second duration that is less than the first duration and the first set of photons being reflected from the object; grouping the photons of the second set of photons depending on times of flight of the photons of the second set of photons; and determining a third time range based on the grouping of the photons of the second set of photons, the third time range being smaller than the second time range.

In accordance with an embodiment of the present disclosure, a device to detect a peak time interval includes: a first counter configured to increment a first count each time a first-counter increment command is received, the first counter being configured to decrement the first count each time a first-counter decrement command is received; a gate circuit configured to receive a photon-detection alert from a radiation-sensitive pixel each time a photon is detected by the radiation-sensitive pixel, the gate circuit comprising a first state wherein the gate circuit transmits the first-counter increment command to the first counter each time the photon-detection alert is received and the gate circuit comprising a second state wherein the gate circuit transmits the first-counter decrement command to the first counter each time the photon-detection alert is received; and a decoder circuit configured to receive the first count from the first counter and configured to receive a timing signal that communicates an optical-emission time by an optical emitter wherein the decoder circuit is configured to deliver a control signal to the gate circuit that: sets the gate circuit to the first state after passage of a first-state delay that is determined based on the first count and measured from the optical-emission time; and sets the gate circuit to the second state after passage of a second-state delay that is determined based on the first count and measured from the optical-emission time.

In accordance with an embodiment, a method includes: identifying a peak-time interval for a set of photons where a peak photon position is located; determining a time range centered around a center of the peak-time interval; dividing the peak-time interval into a first subdivision, a second subdivision, a third subdivision, and a fourth subdivision; emitting the set of photon from a series of optical pulses, each optical pulse of the series of optical pulses having a first duration that is less than a duration of the time range; and calculating a location of the peak photon position within the peak-time interval based on a first photon count of photons of the set of photons having times of flight falling within the first subdivision, a second photon count of photons of the set of photons having times of flight falling within the second subdivision, a third photon count of photons of the set of photons having times of flight falling within the third subdivision, and a fourth photon count of photons of the set of photons having times of flight within the fourth subdivision.

BRIEF DESCRIPTION OF THE DRAWINGS

One or more embodiments will now be described, by way of example only, with reference to the annexed figures, wherein:

FIG. 3 depicts a histogram of data generated for a pixel of a Time of Flight system;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Embodiments of this disclosure provide devices and methods for a detecting peak in Time-of-Flight ("ToF"). This may be advantageous to reduce post-data collection processing and reduce hardware needs.

Figure 1:
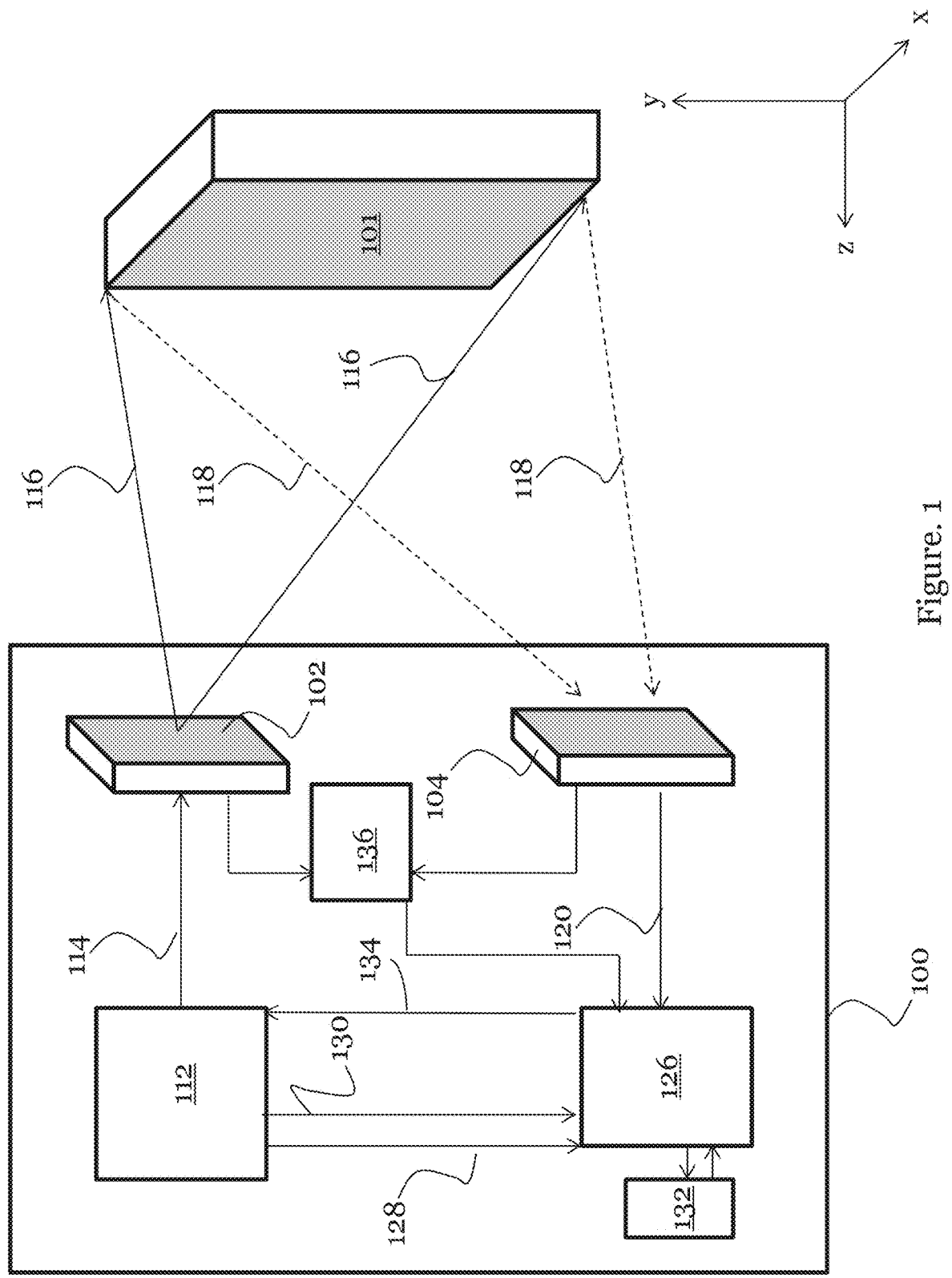
FIG. 1 illustrates an optical system that utilizes ToF measurements to capture depth information about a target object.

FIG. 1 illustrates an optical system that utilizes ToF measurements to capture depth information about a target object.

An object 101 is disposed in a three dimensional environment positioned in front of an optical system 100. The object 101 is provided for explanatory purposes. It should not be considered to impose limitations on the size, shape or distance of objects detectable by an optical system 100. The three-dimensional environment may include additional objects of various shapes or sizes disposed at varying distances from the optical system 100 and the optical system may determine the proximity of the various objects in the three-dimensional environment for imaging the three-dimensional environment. The object 101 may comprise multiple surfaces at various distances from the optical system 100, and the optical system 100 may determine the depth of the different surfaces of the object 101. The optical system 100 may simultaneously determine the proximity of additional objects in the three dimensional environment to generate a three-dimensional image of the three-dimensional environment. A three-dimensional image may comprise a depth map of the three dimensional environment The optical system 100 may comprise an optical source 102, which may be referred to as an optical transmitter, and an optical receiver 104.

Figure 2B:
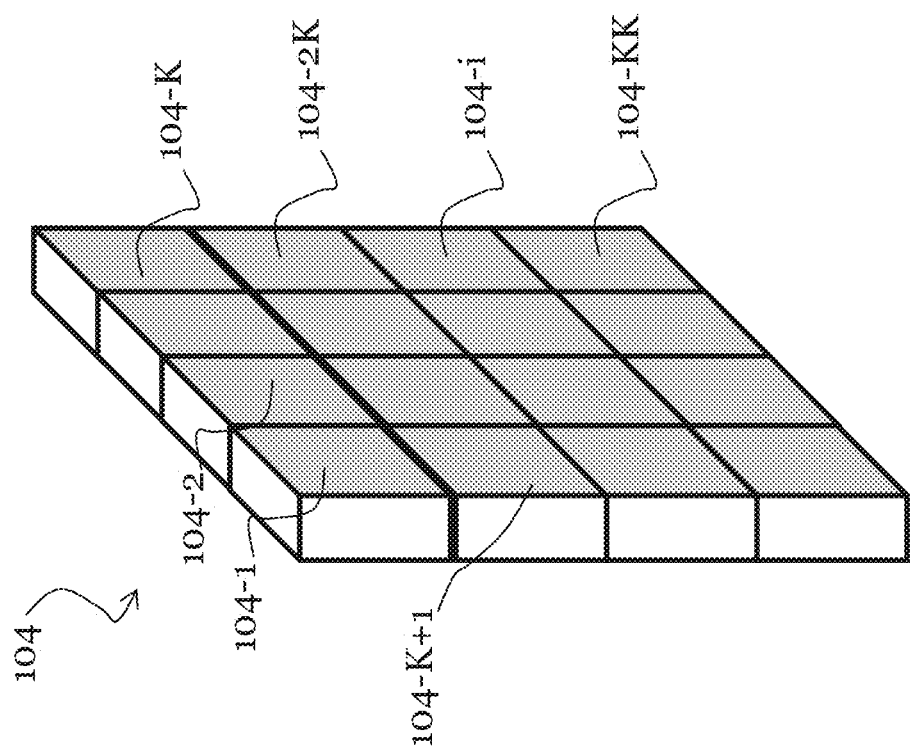
FIG. 2B shows an enlarged view of an optical receiver.
Figure 2A:
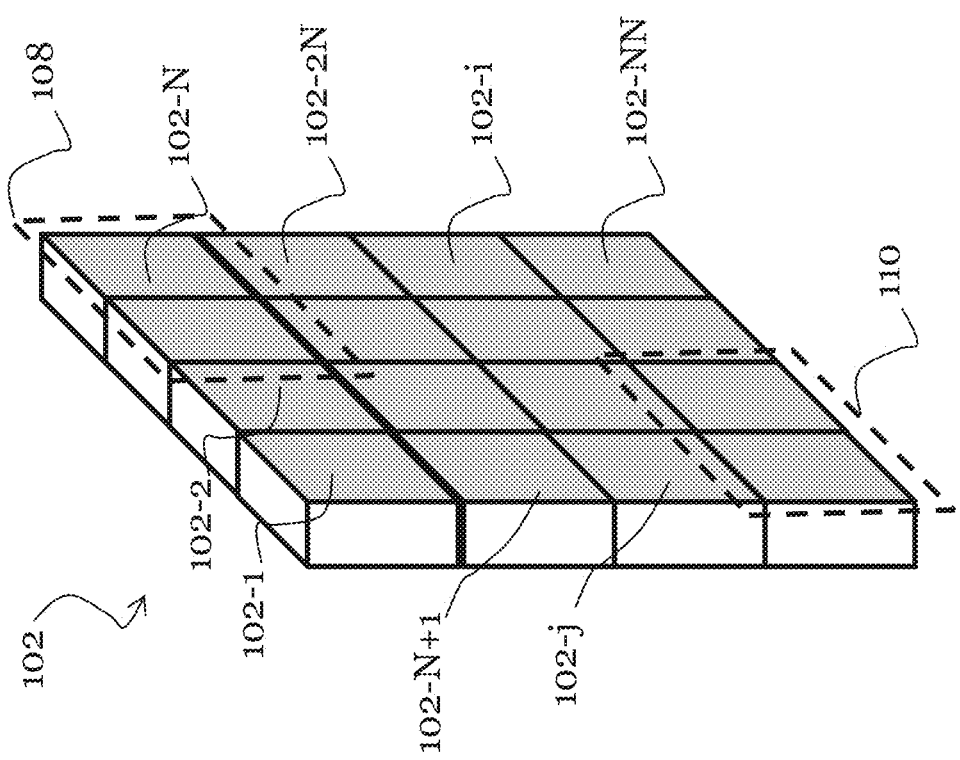
FIG. 2A shows an enlarged view of an optical source.

FIG. 2A shows an enlarged view of the optical source 102.

As depicted in FIG. 2A, the optical source 102 may comprise a plurality of optical emitters 102-1 to 102-NN arranged as an array. Although the example of FIG. 2A illustrates the optical emitters 102-1 to 102-NN as being arranged in a square N×N array, other array shapes (e.g. ellipsoidal arrays or circular-shaped arrays) may be possible in other embodiments. Each of the optical emitters 102-1 to 102-NN may comprise one or more infrared sources, modulated light emitting diodes (LEDs), or semiconductor lasers, or combinations thereof, although other types of optical sources may be possible.

In various embodiments, where the optical emitters 102-1 to 102-NN comprise semiconductor lasers, an optical emitter 102-$i$ of the array of optical emitters 102-1 to 102-NN may comprise one or more vertical-cavity surface-emitting lasers (VCSELs), quantum well lasers, quantum cascade lasers, interband cascade lasers, or vertical external-cavity surface-emitting lasers (VECSELs), or the like.

The optical emitters 102-1 to 102-NN may be configured to operate at the same wavelength. In other embodiments, however, the optical emitters 102-1 to 102-NN may operate at different wavelengths. For example, the group 108 of optical emitters and the group 110 of optical emitters 102-1 to 102-NN may operate at different wavelengths. The optical emitters 102-1 to 102-NN may exhibit continuous wave (CW) operation, quasi-continuous wave (QCW) operation, or pulsed operation.

Referring back to FIG. 1, in various embodiments, the optical system 100 may comprise an optical source driver 112. The operation of the optical emitters 102-1 to 102-NN may be controlled by the optical source driver 112, which is configured to generate a drive current 114 that is capable of activating the array of optical emitters 102-1 to 102-NN, thereby causing the optical emitters 102-1 to 102-NN to emit photons. The optical source driver may also control the duration, timing, and intensity of an optical pulse emitted by the array of optical emitters 102-2 to 102-NN.

In various embodiments, the array of optical emitters 102-1 to 102-NN may be an addressable array of optical emitters 102-1 to 102-NN. The array of optical emitters 102-1 to 102-NN may be individually addressable where an optical emitter 102-$i$ (shown in FIG. 2A) of the array of optical emitters 102-1 to 102-NN is addressable independently of another optical emitter 102-$j$ of the array of optical emitters 102-1 to 102-NN. The drive current 114 provided by the optical source driver 112 to the optical source 102 may cause an optical emitter 102-$i$ to be activated (and thereby emit a photon), while simultaneously causing optical emitter 102-$j$ to be deactivated (and thereby not emit a photon). In various embodiments, the optical emitters 102-1 to 102-NN may be addressable as a group or cluster, where one group 108 of optical emitters 102-1 to 102-NN is addressable independently of another group 110 of optical emitters 102-1 to 102-NN.

In various embodiments, the drive current 114 provided by the optical source driver 112 to the optical source 102 may cause the group 108 of optical emitters 102-1 to 102-NN to be activated (and thereby emit a photon), while simultaneously causing another group 110 of optical emitters 102-1 to 102-NN to be deactivated (and thereby not emit a photon). An effect of operating the array of optical emitters 102-1 to 102-NN in an addressable mode is the ability to dynamically reconfigure an illumination pattern of the optical source 102, an intensity level, or a duration of pulses emitted by each of the optical emitters 102-1 to 102-NN of the array of optical emitters 102-1 to 102-NN to adapt to various applications, environments, or cycles of an operation.

Radiation (light) emanating from the optical source 102, collectively shown in FIG. 1 as reference numeral "116" using solid arrows, may be incident upon the object 101. The incident radiation 116 is reflected off the object 101 to produce reflected radiation 118. It is noted that although incident radiation 116 and reflected radiation 118 are represented in FIG. 1 by few arrows, all radiation incident on and reflected from the object 101 may be combined in one beam or cone of radiation. While some part of the incident radiation 116 may be scattered depending upon the surface features of the object 101, a significant part of the incident radiation 116 may be reflected, thereby producing the reflected radiation 118.

The optical receiver 104 receives the reflected radiation 118 and generates an output signal 120 in response to the reflected radiation 118 striking the optical receiver 104. The output signal 120 may be a digital signal or an analog signal, depending on the circuitry of the optical receiver 104.

FIG. 2B shows an enlarged view of the optical receiver 104.

As depicted in FIG. 2B, the optical receiver 104 may comprise a plurality of radiation-sensitive pixels 104-1 to 104-KK. Although the example of FIG. 2B illustrates the radiation-sensitive pixels 104-1 to 104-KK as being arranged in a square K×K array, other array shapes (e.g. ellipsoidal arrays or circular-shaped arrays) may be possible in other embodiments. The intrinsic spatial resolution of the optical system 100 may be determined by the resolution of the optical receiver 104. For example, since the radiation-sensitive pixels 104-1 to 104-KK in the embodiment of FIG. 2B are arranged as a K×K array, the intrinsic spatial resolution of the optical system 100 may be a K×K image. It is noted that the output signal 120 may be expressed as a K×K matrix of measurements, or a 1×K$^2$ vector of measurements, with each entry of the matrix corresponding to the signal received from a respective pixel of the plurality of radiation-sensitive pixels 104-1 to 104-KK.

The radiation-sensitive pixel 104-1 may comprise single-photon avalanche diodes (SPADs) photo diodes (PDs), avalanche photo diodes (APDs), or combinations thereof. Each radiation-sensitive pixel may also comprise a one or more light-detecting elements (such as a spad) coupled with an OR tree.

As shown in FIG. 1, the optical system 100 further comprises a processor 126 configured to receive the output signal 120 and determine the proximity of the object 101 to the optical system 100 based on the output signal 120. The processor 126 can additionally reconstruct 3D images of the object 101 based on the output signal 120 as well as 2D intensity images related to reflective properties of surfaces in the scene.

The optical source driver 112 may be programmed to drive all the optical emitters 102-1 to 102-NN in the array of optical emitters 102-1 to 102-NN to generate incident radiation pulses. The optical source driver 112 may receive a control signal 134 from the processor 126 that initiates the optical source driver 112. The control signal 134 may determine which of the optical emitters 102-1 to 102-NN are active and which are inactive.

Arrival times of the pulses of reflected radiation 118 at the optical receiver 104 are proportional to twice the distance between the object 101 and the optical system 100, based on the speed of light in the measurement medium or environment.

The optical source 102 may comprise VCSELs, while the optical receiver 104 may comprise high speed photodetectors (e.g. SPADs). The optical receiver 104 may be configured to record at least one of arrival times, pulse shapes, or intensities of the pulses of reflected radiation 118. Reflected radiation 118 may arrive at different times at the optical receiver 104, depending on the respective distances between the different parts of the object 101 or other objects in the three-dimensional environment and the optical system 100. The reflected radiation 118 may be detected synchronously with a timing signal 130 that is configured to cause the optical source driver 112 to generate incident radiation 116. The processor 126 may analyze the time-of-flight between emission of incident radiation 116 travelling towards the object 101 and arrival of reflected radiation 118 received at the optical receiver 104 to determine the proximity of the object 101 of objects in the three-dimensional environment. A plurality of proximity measurements may be used to generate a comprehensive set of data to accurately determine both lateral spatial distances (e.g. in the x-y plane shown in FIG. 1) and depth (e.g. along the z-axis shown in FIG. 1) of the object or objects in the three-dimensional environment.

In various embodiments, the optical system 100 may comprise one or more time to digital converters. TDC 136 in communication with the optical source 102, the optical receiver 104, and the processor. The one or more TDCs 136 may measure the interval between the emission of incident radiation 116 from the optical source 102 and the arrival of reflected radiation 118 at the optical receiver 104 and provide it to the processor 126. In various embodiments, the processor 126 may comprise the TDC and the interval between emission and arrival may be calculated using a timing signal 130 to trigger the emission and the time of arrival. The optical system 100 may also comprise a memory 132 (non-transitory) where an instruction sets may be stored.

In Direct ToF applications, photons counted at a radiation-sensitive pixel may be categorized based on ToF analysis to generate a histogram of estimated distances of the object or surface that reflected the radiation to the radiation-sensitive pixel. Conceptually, the ToF of a photon sensed at a radiation-sensitive pixel may be calculated and assigned to a bin that represents a distance. As additional photons are sensed during a measurement, they may be assigned to a bin. The various bins may accumulate a photon count and the distribution of photons in the various bins may be used to estimate the distance from the optical system 100 of the reflective surface measured at the radiation-sensitive pixel.

FIG. 3 depicts a histogram of data generated for a pixel of a Time of Flight system.

The vertical axis in FIG. 3 represents the magnitude of a photon count and the horizontal axis represents time (in nanoseconds) relative to emission of an optical pulse. An activation signal 303 for an optical emitter indicates when the optical emitter is on and emitting photons. The activation signal 303 depicts an optical pulse 303A during an optical-emission period 301. As the amplitude of the optical pulse 303A increases, the signal to noise ratio of photons detected by a radiation also increases. Likewise, increasing the duty cycle of the optical pulse 303A also increases the signal to noise ratio at the signal. However, safety and efficiency considerations may constrain the advantages offered by increasing the amplitude, duty cycle, or both of the optical pulse 303A.

The optical-emission period 301 may be divided into a number of bins 307. The number of bins may vary from system to system. Each bin corresponds to a time interval of the optical emission period and to a distance for an object in a three-dimensional environment due to the relationship between the time of flight of detected photons and the distance of the object. For example, an optical emission period that is 64 nanoseconds long may be divided into 64 bins, each bin representing a one nanosecond time interval. Photons detected during an optical-emission period 301 are counted and allocated to the appropriate bin. For example, photons detected during a first time interval are allocated to a first bin, photons detected during a second time interval are allocated to a second bin, and etc. Photon counts from multiple optical-emission periods 301 may be aggregated to generate a histogram 305. In some cases, photon counts from thousands or hundreds of thousands, of optical emission may be aggregated to produce a histogram 305.

Photons emitted by an optical source during an optical pulse may be reflected off a target object in a three-dimensional environment. A photon count may reveal a reflected pulse 311 of photons arriving at a radiation-sensitive pixel. The time between the optical pulse 303A and the reflected pulse 311 may be used to determine the distance between the target object and the ToF system. Cross talk from the optical pulse 303A may produce a cross-talk pulse 309. The optical-emission period 301 may comprise a blanking time 313A to reduce the effect of cross-talk on the histogram.

To determine the distance of an object, the histogram results needs to be processed to detect the peak time interval to discriminate photons reflected from a target object in noise or photons reflected off other objects in a 3D environment. Typically, the dominating peak will be issued from an object of interest. And, secondary peaks may be initially ignored or rejected.

This processing may be necessary for each pixel of an optical receiver, which may create challenges for scaling solutions. As greater and greater resolution is desired, this imposes a greater and greater burden on the processing and memory capabilities of a ToF system. Some direct ToF systems may feature a scanning system for illumination Scanning systems may be electrical, with laser addressable arrays. And, scanning systems may be mechanical, often seen on automotive LIDARs, or micromirrors MEMs, and in other devices. A scanning system may increase resolution with less duplication of the receiver hardware and power. However additional measures may be beneficial to improve efficiency of ToF systems.

In various embodiments, these processing demands may be sidestepped by a recursive approach that detects the peak time interval before processing and may eliminate the need to save count information for each bin of each pixel. In various embodiments, progressively refined search windows (time ranges) may be iteratively determined to identify the location of the peak time interval before processing. As the search windows (time intervals) become progressively smaller, the duration of the optical pulses for emitting photons may also decrease. The final time interval may be transmitted to the processor as the peak time interval. And, in various embodiments, this may eliminate the need for transmission of a full histogram of data for processing.

For example, during a first step, photons emitted by an optical pulse (or series of optical pulses) and detected during a first time period may be counted and grouped according to their times of flight relative to emission. The first time period may comprise a series of optical pulses whose photons are counted and grouped. A first set of photons having times of flight within a first time range may be counted grouped according to subdivisions. Each subdivision may comprise a range, and any photon having a time of flight falling within that range may be counted for that subdivision. For example, photons having times of flight within a first subdivision may be counted for the first subdivision. Photons having times of flight within a second subdivision may be counted for the second subdivision and so on. In various embodiments, the number of subdivisions may differ. And, the subdivisions may, in various embodiments, comprise overlapping ranges.

The results of the photon count from first time period may be used to refine the range for counting photons in a subsequent period or periods. For example, the counts for the subdivisions of the first time range maybe used to identify a time interval where the peak may be located and they may be used to determine a second time range that is smaller than the first time range. As will be appreciated, it may be likely that the peak is located in, or near, a region of the first time range where the photon count is greatest. Once such a region is identified, it may then be used to narrow the search for the peak time interval during a second time period to a second time range that is smaller than the first range. The second time range may be used during a second time period where a second optical pulse (or series of optical pulses) are emitted and photons having times of flight falling within the second time range counted and grouped. The optical pulse (or series of optical pulses) of the second time period may have a duration that is less than the optical pulse (or series of optical pulses) of the first time period. The reduction in the duration of the optical pulse (or series of optical pulses) of the second time period relative to the optical pulse (or series of optical pulses) may correspond to the decrease in size of the second time range relative to the first time range. The results of the second time period (the second count) may then be used to define a third time range, smaller than the second time range, for counting photons during a third time period. The optical pulse (or series of optical pulses) of the third time period may have a duration that is less than the optical pulse (or series of optical pulses) of the second time period. And, the decrease in the duration of the third time range may correspond to the decrease in the duration of the optical pulse (or pulses) of the third time period. This may be repeated to identify progressively smaller time ranges until it is small enough to be satisfactory to be used as a peak-time interval. In various embodiments, this recursive process may be accomplished with hardware to reduce processing required for ToF imaging. In various embodiments, each radiation-sensitive pixel of an optical receiver may be paired with hardware for selecting a peak time interval for that pixel. In various embodiments, data from a count from a final time period may be transmitted to a processor and used to identify a location of peak photon position within the peak time interval.

Figure 4:
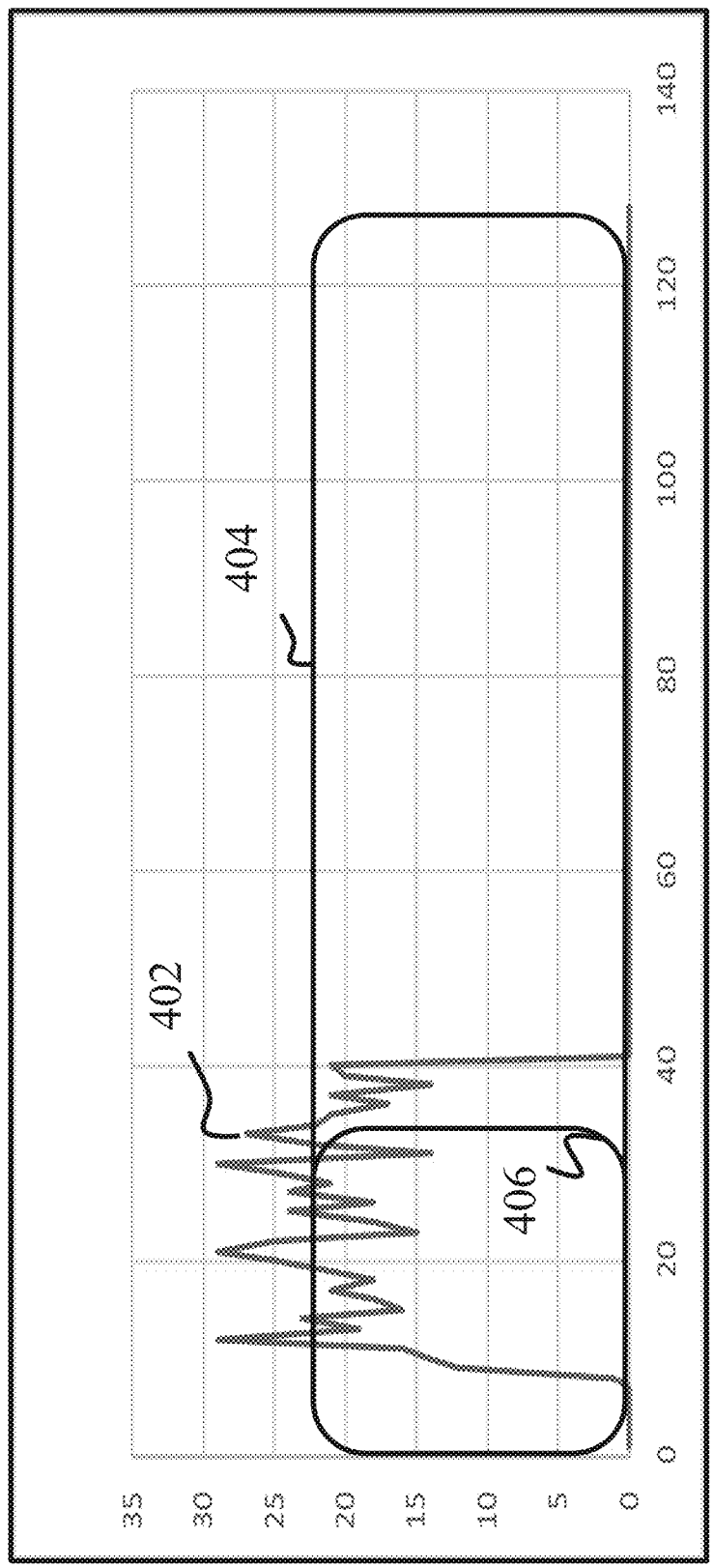
FIG. 4 graphically depicts a first step to identify a peak position of an embodiment.

FIG. 4 graphically depicts a first step 400 to identify a peak position.

In various embodiments, a first time range 404 may comprise 128 nanoseconds after emission of an optical pulse. In various embodiments, the first time range may be larger or smaller than 128 nanoseconds. Photons having times of flight within the first time range may be counted to produce the photon-count curve 402. The photon count may comprise an aggregation of counts corresponding to a series of optical pulses during a first time period wherein photons having times of flight within the time range for each optical pulse are counted and aggregated according to their times of flight with respect to their emission. The photon-count curve 402 may depict the results of an aggregated photon count conducted during a first time period. The results of the photon count from the first time period may be used to identify a second time range for a photon count generated during a second time period.

For example, it may be determined that a first region 406 of the first time range 404 is the most likely location of a peak, like the example depicted in FIG. 4. This may be used to determine the second time range. For example, in various embodiments, a size of the second time range may be predetermined, and the second time range may be centered around the midpoint of the region identified as most likely to contain a peak. In various embodiments, the second time range may be half the duration of the first time range or substantially half the duration of the first time range. As will be appreciated, the size of the second time range relative to the first time range may vary in different embodiments. Similarly, the duration of the optical pulse (or pulses) of the second time period may be half the duration of the first optical pulse. And, in various embodiment the duration of the optical pulse (or pulses) of the second time period may vary relative to the duration of the optical pulse (or pulses) of the first time period.

Figure 5:
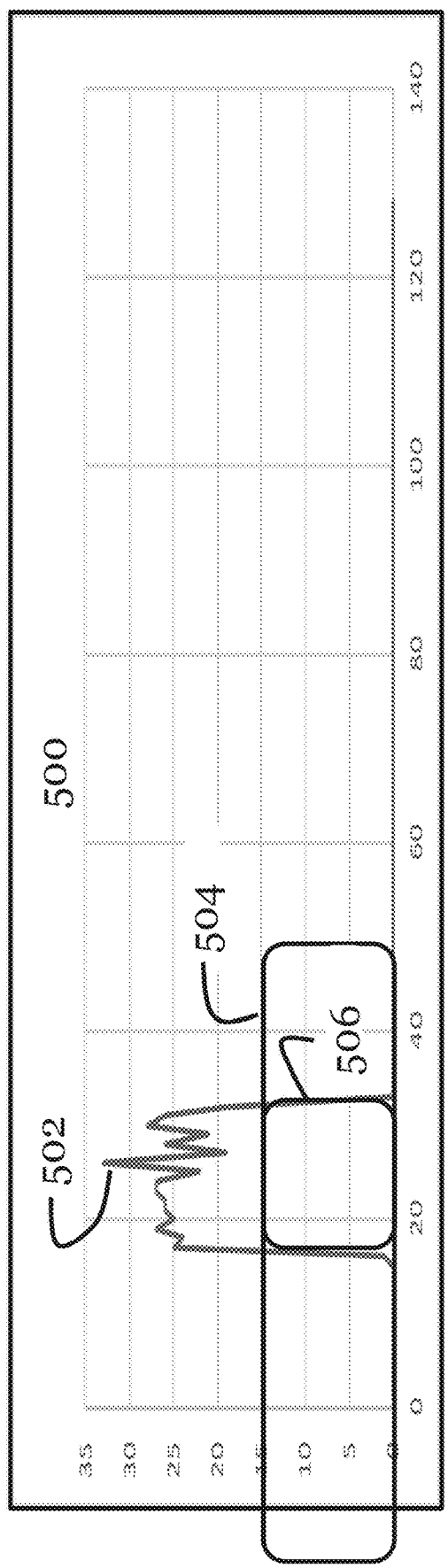
FIG. 5 graphically depicts a second step to identify a peak position of an embodiment.

FIG. 5 graphically depicts a second step 500 to identify a peak position.

The second time range 504 may have a duration 64 nanoseconds (half the duration of the first time range). In various embodiments, the duration may be different relative to the first time range. From the photon-count curve 402 from FIG. 4, it may be determined that the peak is most likely to be found in the first region 406 of the first time range 404, which ranges from zero nanoseconds to 32 nanoseconds. Using this example, centering, the second time range around the midpoint of the first quadrant produces a second time range 504 centered about the $16^{th}$ nanosecond after emission. It should be appreciated, in this example, a portion of the second time range 504 is negative, which may be the case depending on the size and duration of a time range. In some cases, as will be explained in more detail with reference to FIG. 10, it may be desirable to offset the second time range so that the second time begins at zero. However, in various embodiments, an offset may not be desirable.

For a second time period, photons emitted by an optical pulse (or series of optical pulses) and having a time of flight within the second time range 504 may be counted and grouped. It may be determined from the photon count that the peak is most likely to be found in the time range spanning the $16^{th}$ nanosecond after emission to the $32^{nd}$ nanosecond after emission (region 506). In various embodiments, this interval may then be used to determine a third time range for detecting photons emitted during a third period.

Figure 6:
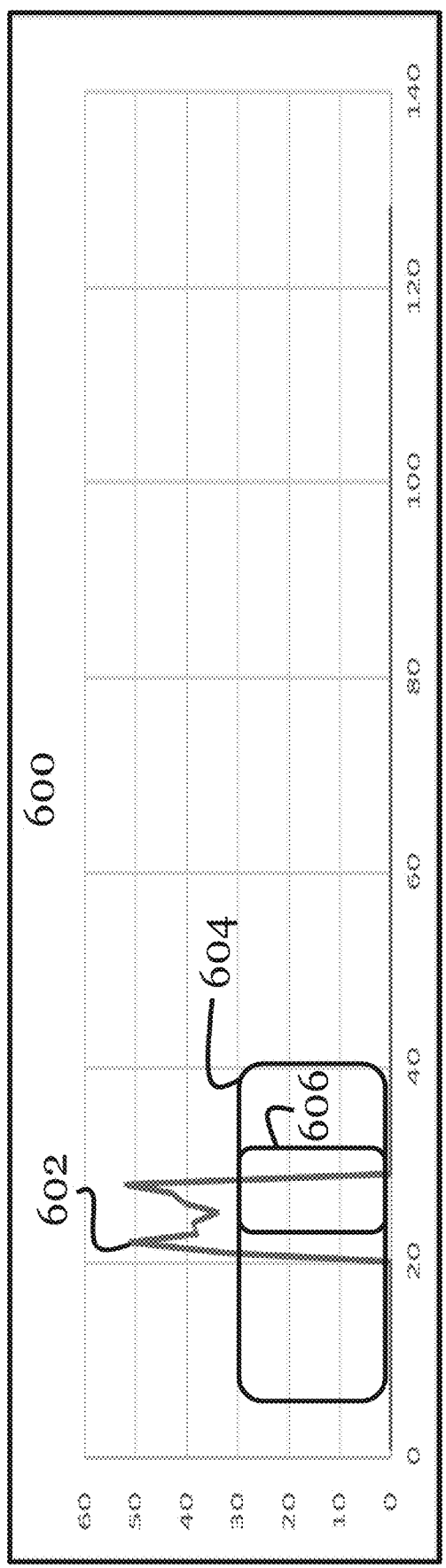
FIG. 6 graphically depicts a third step to identify a peak position of an embodiment.

FIG. 6 graphically depicts a third step 600 to identify a peak position.

The duration of a third time range 604 may be half the duration of the second time range 504 further refining the search window. However, the durations may vary in different embodiments, as with other durations of this disclosure. Likewise, the duration of an optical pulse (or series of optical pulses) of the third time period may be half the duration of the optical pulse (or pulses) of the second time period. But the duration may vary in different embodiments.

In various embodiments, the duration the third time range 604 may be 32 nanoseconds (half the 64 nanosecond duration of the second time range 504 in FIG. 5). The third time range 604 may be centered around the $24^{th}$ nanosecond (the midpoint of the highest population region of the second time range from the example in FIG. 4).

In various embodiments, the durations of the time may be predetermined according to the current step. A time range for a first step may have a predetermined duration, for example 128 nanoseconds, and time ranges for subsequent steps may also have predetermined durations (64 nanoseconds for a second step 32 nanoseconds for a third step, etc).

Returning to FIG. 6, for a third time period, photons emitted by an optical pulse (or series of optical pulses) and having a time of flight within the third time range 604 may be counted and grouped. It may be determined that from the photon count that the peak is most likely to be found in a region 606 covering the $24^{th}$ nanosecond after emission to the $32^{nd}$ nanosecond after emission (as depicted in the example in FIG. 6). In various embodiments, this interval may then be used to determine a fourth time range for detecting photons emitted during a fourth period.

Figure 7:
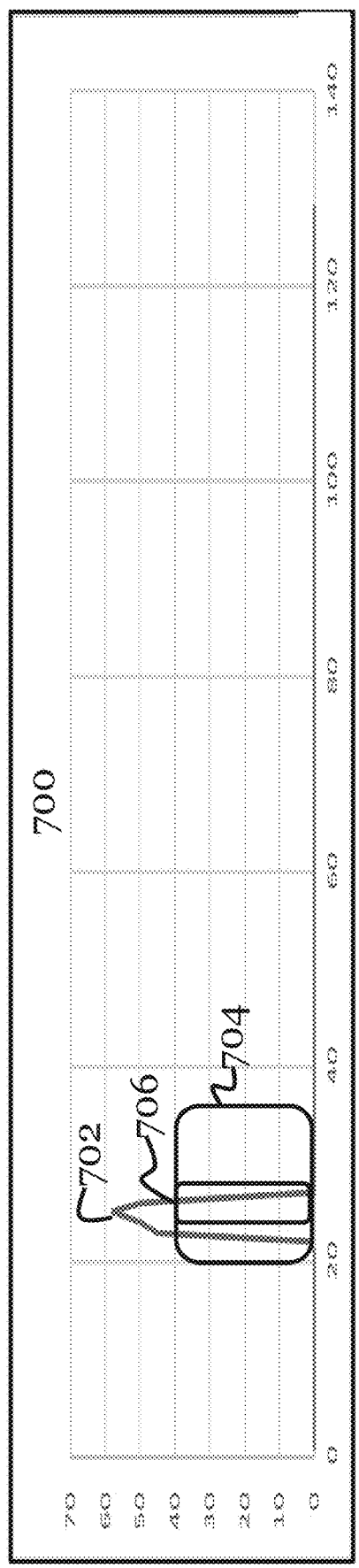
FIG. 7 graphically depicts a fourth step to identify a peak position of an embodiment.

FIG. 7 graphically depicts a fourth step 700 to identify a peak position.

The duration the fourth time range 704 may be 16 nanoseconds (half the 32 nanosecond duration of the third time range 604 in FIG. 5). As noted, the duration may vary in various embodiments. Likewise, the duration of an optical pulse (or series of optical pulses) of the fourth time period may be half the duration of the optical pulse (or pulses) of the third time period. But the duration may vary in different embodiments. The fourth time range 704 may be centered around the $28^{th}$ nanosecond based on the photon-count curve 602 from FIG. 6. Again, durations, may vary in various embodiments.

For a fourth time period, photons emitted by an optical pulse (or series of optical pulses) and having a time of flight within the fourth time range 704 may be counted and grouped. It may be determined that from the photon count that the peak is most likely to be found in the region 706 spanning the $24^{th}$ nanosecond after emission to the 28th nanosecond after emission (as depicted in FIG. 7). In various embodiments, this interval may then be used to determine a fifth time range for detecting photons emitted during a fifth time period.

Figure 8:
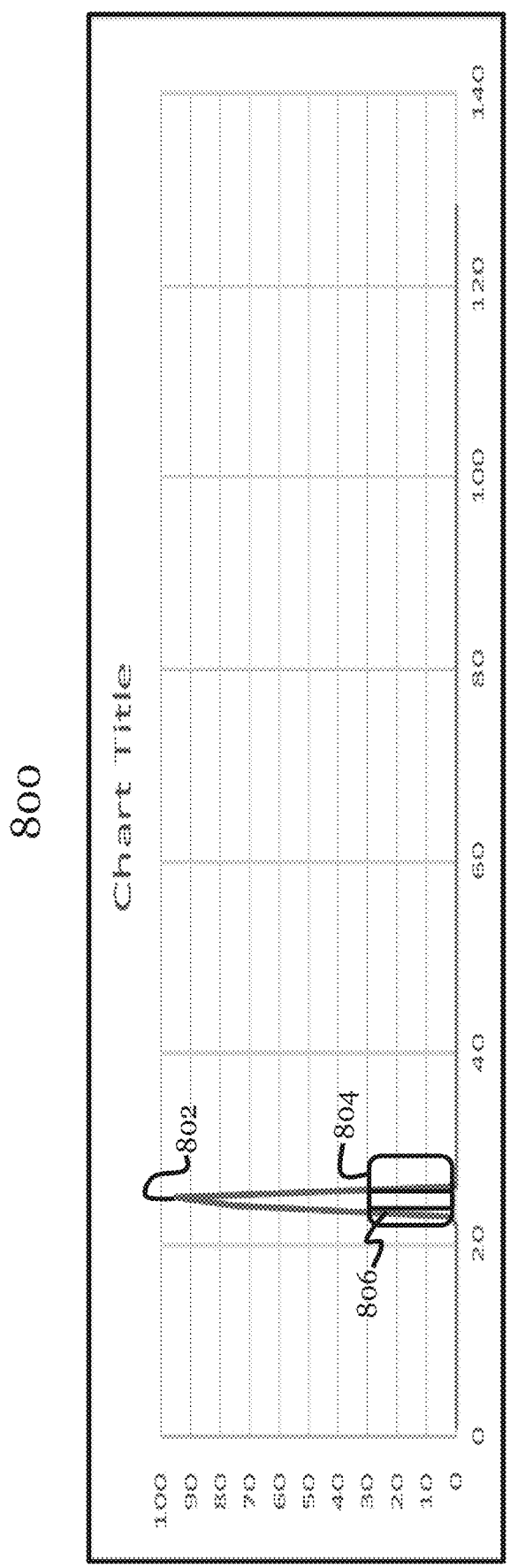
FIG. 8 graphically depicts a fifth step to identify a peak position of an embodiment.

FIG. 8 graphically depicts a fifth step 800 to identify a peak position.

The duration the fifth time range 804 may be 8 nanoseconds, once again, halving, and further refining the duration of the preceding time range, although, the duration may vary in various embodiments. Likewise, the duration of an optical pulse (or series of optical pulses) of the fifth time period may be half the duration of the optical pulse (or pulses) of the fourth time period. But the duration may vary in different embodiments. The fifth time range 804 may be centered around the $26^{th}$ nanosecond after a fifth optical pulse based on the location of the region of the photon-count curve 702 from FIG. 7 most likely to find the peak. For a fifth time period, photons emitted by an optical pulse (or series of optical pulses) and having a time of flight within the fifth time range 804 may be counted and grouped. It may be determined from the photon count that the peak is most likely to fall in the region 806 ranging from the 24$^{th}$ nanosecond after emission to the 26th nanosecond after emission (as depicted in FIG. 8).

Additional steps of the iterative process may be continue as described with reference to FIG. 4 through FIG. 8, until the time range comprises the desired range for a final peak time interval estimate. The duration of the optical pulses for corresponding time periods may also continue to be reduced. The peak time interval may be transmitted to a processor 126 to calculate a distance corresponding to the time interval. In various embodiments, a final step to find a peak position may comprise finding a location of a peak photon position within the peak time interval.

In various embodiments, various approaches may be utilized for grouping and counting photons to identify the time ranges where the peak is most likely to be found and peak time interval described in the preceding paragraphs. In various embodiments, this may comprise dividing time ranges into subdivisions and counting photons detected during the subdivisions. Comparisons between the subdivisions may be used to determine where the photon count is highest relative to each other and determine subsequent time ranges, and generate an estimate for the peak time interval.

Figure 9:
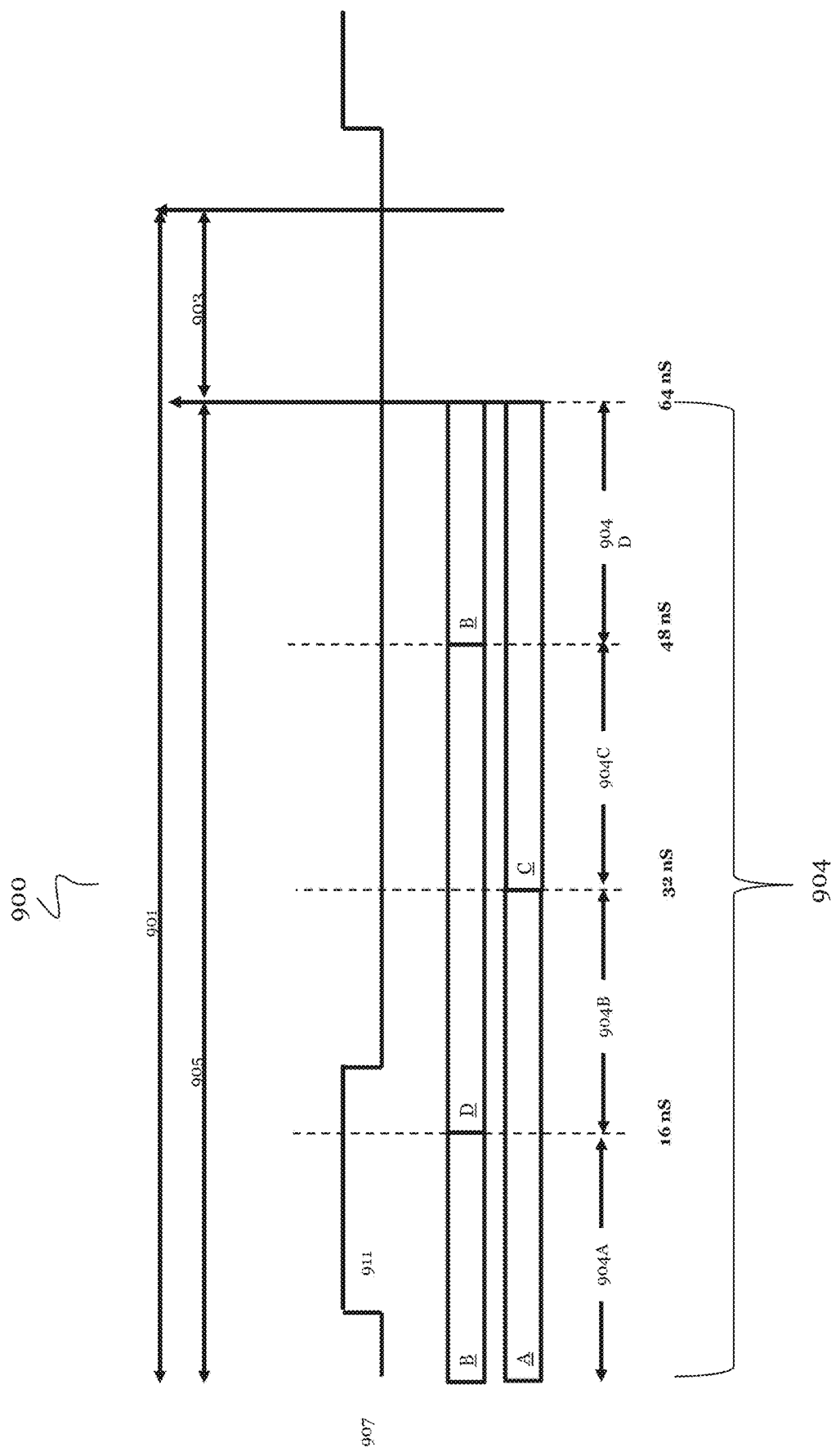
FIG. 9 graphically illustrates a first step to identify a peak position of an embodiment.

FIG. 9 graphically illustrates a first step 900 to identify peak position.

Once again, the vertical axis in FIG. 9 through FIG. 13 represents amplitude and the horizontal axis represents time (in nanoseconds). Photons may be emitted during a first emission periods 901. The photons may be detected by a radiation-sensitive pixel. The photon-count curve 907 represents the magnitude of the photon count as a function of time. The photon count curve in FIG. 9 through FIG. 13 is presented as a smooth pulse for ease of representation. The interval 911 may correspond to the duration of an optical pulse (or series of optical pulses) of the first time period. The duration of the interval 916 may comprise 16 nanoseconds (like in FIG. 9). In various embodiments, the first emission period 901 may also comprise a blanking period 903 and a ranging period 905. The duration of the optical pulse, or pulses, and the first emission period 901 determines a duty cycle of the optical pulse. In various embodiments, the ranging period 905 may comprise 64 nanoseconds and the first emission period 901 may comprise 80 nanoseconds. As discussed previously, durations may vary in various embodiments and a photon count may be aggregated over a series of optical pulses (and corresponding emission periods, blanking periods, ranging periods, and time range) occurring in a time period During the first step 900, photons emitted by a first optical pulse (or series of optical pulses) and having times of flight falling within the first time range 904 may be detected by a radiation-sensitive pixel. In various embodiments, a first time range 904 may comprise the entirety of the ranging period 905.

For grouping, counting, or both, the first time range 904 may be divided into subdivisions. In various embodiments, the subdivisions may comprise a first subdivision A, a second subdivision C, a third subdivision B, and a fourth subdivision D. Each subdivision may correspond to a range of time within the first time range 904. For example, the first subdivision A may correspond to the first 32 nanoseconds of a first time range 904 comprising 64-nanoseconds. The second subdivision C may correspond to the last 32 nanoseconds of a first time range 904 that comprises 64 nanoseconds. The third subdivision B may correspond to the first 16 nanoseconds and the last 16 nanoseconds of a 64-nanosecond, first time range 904. And, the fourth subdivision D may correspond to the middle 32 nanoseconds of a 64-nanosecond, first time range 904.

In various embodiments, there may be more or less subdivisions. The subdivisions may overlap. And, the subdivisions may be continuous or discontinuous (like the third subdivision B as depicted in FIG. 9) in various embodiments. In various embodiments, a photon detected during overlapping subdivisions may be counted for each subdivision.

Photons having a time of flight falling within the first time range 904 may comprise a first set of photons. The first set of photons may be grouped into the subdivisions based on the times of flight of the photons. The times of flight of the photons may be deduced from the time when a photon is detected and compared with the time of emission of an optical pulse. Grouping the first set of photons may comprise counting the number of photons detected during each subdivision of the first time range 904. The count may be used to determine a second time range for a second time period.

In various embodiments, to find the region where a peak is most likely to be found, the number of photons counted in the first subdivision A may be compared with the number of photons counted in the second subdivision C. Similarly, the number of photons counted in the third subdivision B may be compared with the number of photons counted in the second subdivision D. If the number of photons counted in the first subdivision A is greater than the number of photons counted in the second subdivision C, and the number of photons counted in the third subdivision B is greater than the number of photons counted in the fourth subdivision D, it may be determined that the peak is most likely to be found in the first quadrant 904A of the first time range 904. If the number of photons counted in the first subdivision A is greater than the number of photons counted in the second subdivision C, and the number of photons counted in the third subdivision B is less than the number of photons counted in the fourth subdivision D, it may be determined that the peak is most likely to be found in a second quadrant 904B of the first time range 904. If the number of photons counted in the first subdivision A is less than the number of photons counted in the second subdivision C, and the number of photons counted in the third subdivision B is greater than the number of photons counted in the fourth subdivision D, it may be determined that the peak is most likely to be found in a fourth quadrant 904D of the first time range 904. If the number of photons counted in the first subdivision A is less than the number of photons counted in the second subdivision C, and the number of photons counted in the third subdivision B is less than the number of photons counted in the fourth subdivision D, it may be determined that the peak is most likely to be found in a third quadrant 904C of the first time range 904.

A second time range may be determined based on the grouping counting of the first set of photons. For example, the second time range may be centered around the midpoint of the portion of the time range where the peak is most likely to be found. This may be accomplished as previously described with reference to FIG. 4, FIG. 5, FIG. 6, FIG. 7 and FIG. 8. In various embodiments, other techniques may be used to count photons from the first time period to determine where a peak is most likely to be found and used for determining a second range for a second time period. For example, the time range may comprise two subdivisions, non-overlapping subdivisions, or more subdivisions. In various embodiments a raw tally of the photons in non-overlapping subdivisions may be used and compared with each other to find the portion of the time range where the most photons are counted.

Figure 10:
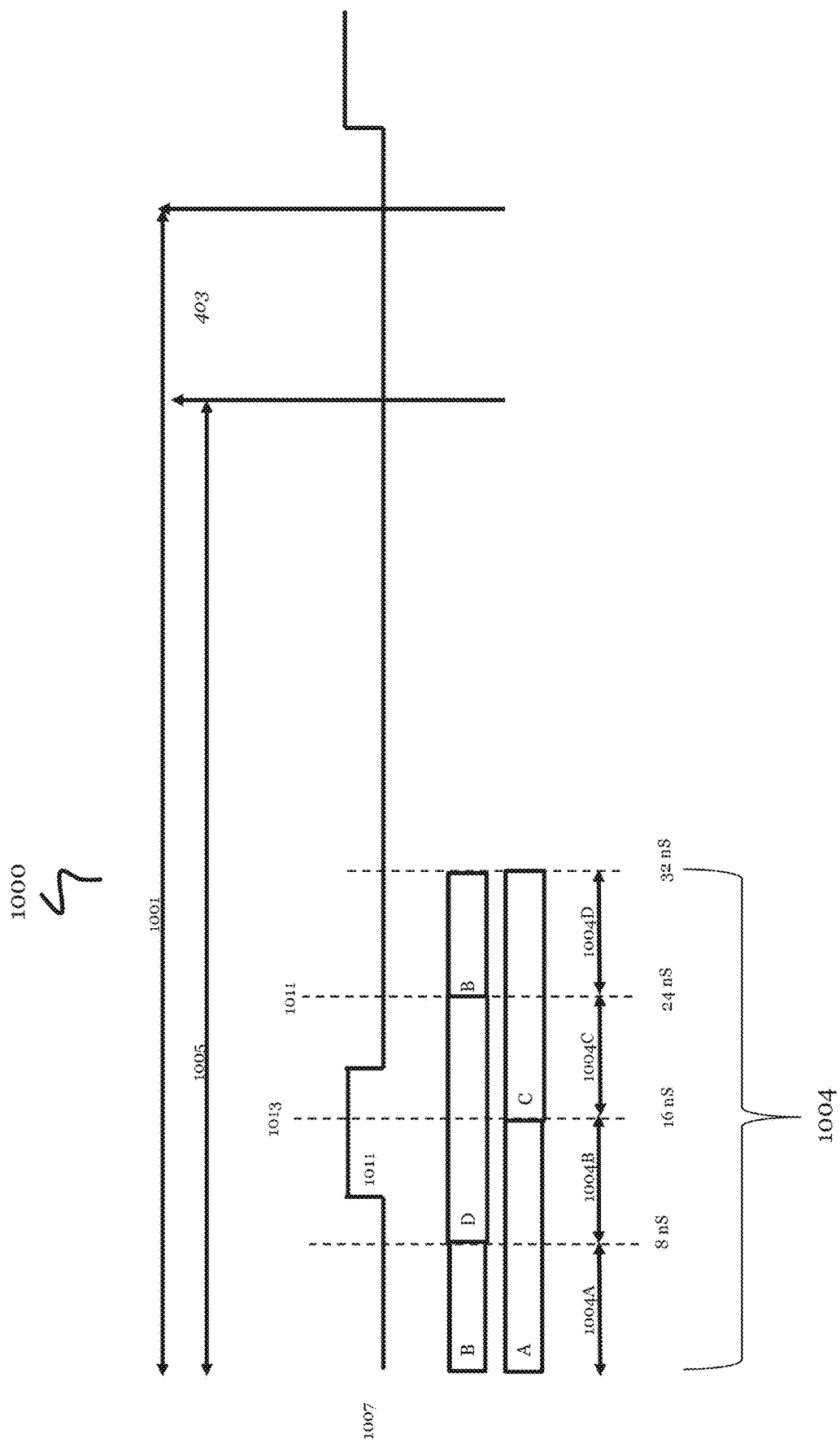
FIG. 10 graphically depicts a second step to determine a peak position of an embodiment.

FIG. 10 graphically depicts a second step 1000 to determine a peak position.

Using the photon count from the first time period, the second time range 1004 may be determined. The second time range 1004 may be smaller than the first time range 904 to refine the window searched for the peak position. As discussed with reference to FIG. 4, FIG. 5, FIG. 6, FIG. 7 and FIG. 8 determining the second time period may comprise using the photon count from the preceding step as a reference for centering the subsequent time period based on where a peak is most likely to be found. The photon-count curve 1007 represents the magnitude of the photon count as a function of time. The duration of pulse 1011 may correspond to the duration of an optical pulse (or series of optical pulses) of the second time period. The duration of the optical pulse (or series of optical pulses) of the second time period may decrease relative to the duration of the optical pulse of the preceding time period. In various embodiments, the duration of pulse 1011 may comprise 8 nanoseconds, like depicted in FIG. 10 (half the duration of the interval 911 depicted in FIG. 9). For example if the most photons were determined to be in the first quadrant 904A of the first time range 904, the second time range 1004 may be centered around the middle of the first quadrant 904A (the interval at the $8^{th}$ nanosecond). However, for this example, this causes a portion of a second time range to cover negative times of flight. In various embodiments, it may be desirable to prevent time ranges from extending into negative ranges. Continuing with the example above, an 8 nanosecond offset may shift the center 1013 of a second time range 1004 to the $16^{th}$ nanosecond. The size of an offset, in various embodiments, may be selected to begin at time period at zero.

In various embodiments, a second set of photons emitted may be detected during a second time period. In FIG. 10, this may be represented by the pulse 1011. The second time period may comprise a series of optical pulses. Photons detected during the second period having times of flight falling within the second time range 1004 may be counted and grouped. The second time range 1004 may be divided into subdivisions like described with reference to the first time range 904. In various embodiments the subdivisions may comprise a first subdivision A, a second subdivision C, a third subdivision B, and a fourth subdivision D. Photons of the second set of photons may be grouped according their time of flight, which, as already mentioned, may be determined with reference to their emission from an optical emitter. And, the grouping of the second set of photons may be used to determine a third time range for a third time period, which may comprise any of the approaches described with reference to FIG. 9 for determining subsequent time ranges from the results of the photon count from preceding steps based on where the peak is most likely to be found. In various embodiments the results of the photon count for the second time period may be used to center the third time range. In various embodiments, the second photon count may show that the peak is most likely to be found in the quadrant 1004A, a second quadrant 1004B, a third quadrant 1004C, or a fourth quadrant 1006D. And, the third time range may be centered around the midpoint of the quadrant where the photon count is found to be most likely.

Figure 11:
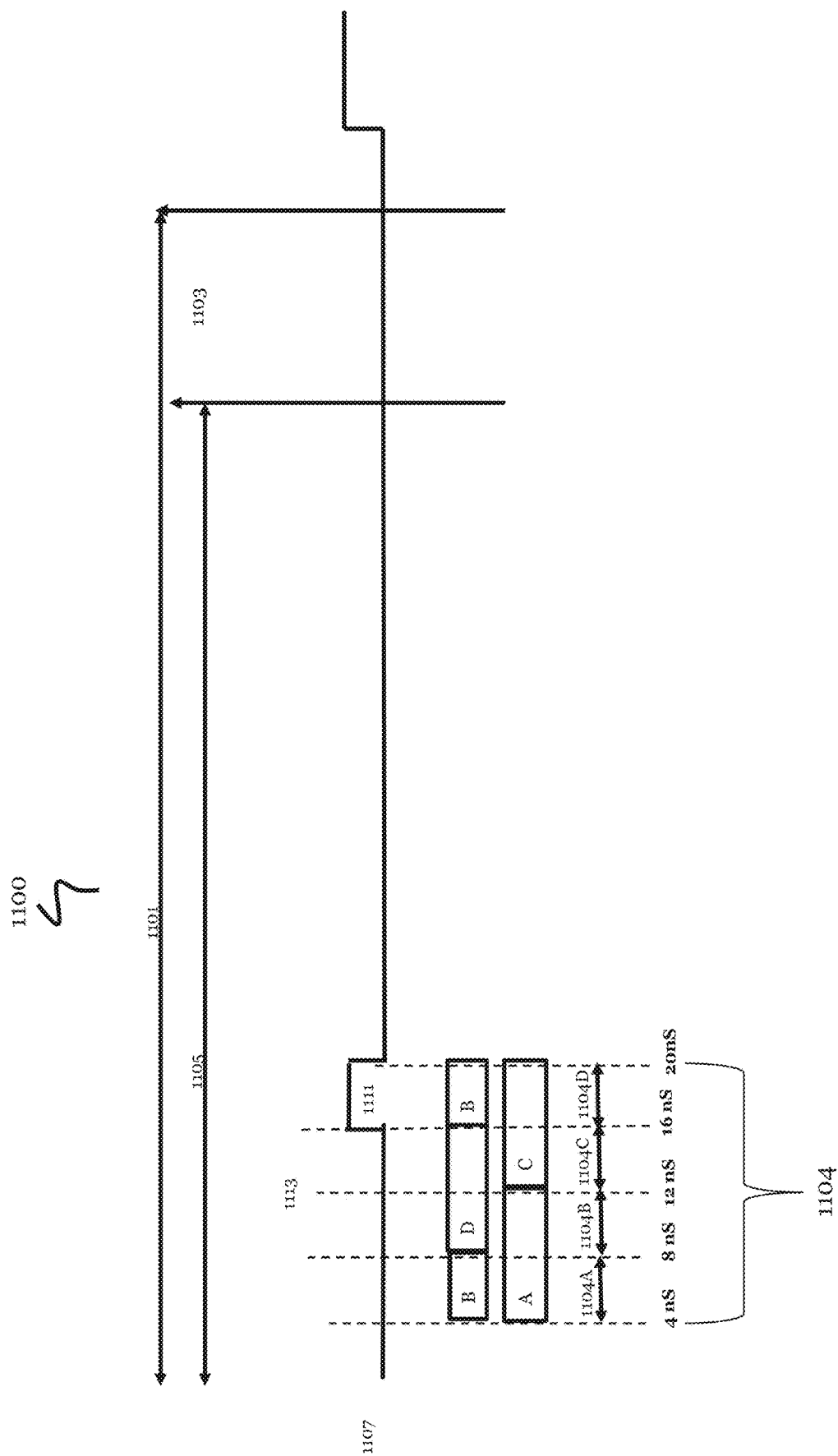
FIG. 11 depicts a third step to determine a peak position of an embodiment.

FIG. 11 depicts a third step 1100 to determine a peak position.

Using the photon count from the preceding step, a third time range 1104 may be determined to be centered 1113 at the $12^{th}$ nS. The third time range 1104 may be smaller than the second time range 1004 refining, again, the search window for the peak. A third set of photons emitted may be detected during a second time period. The interval 1111 of photon count 1107 may correspond to the duration of an optical pulse (or series of optical pulses) of the third time period. The duration of the optical pulse (or series of optical pulses) of the third time period may decrease relative to the duration of the optical pulse of the preceding time period. In various embodiments, the interval 1111 may comprise 4 nanoseconds, like depicted in FIG. 11 (half the duration of the duration of pulse 1011 depicted in FIG. 10). The third time period may comprise a series of optical pulses. Photons detected during the third period having times of flight falling within the third time range 1104 may be counted and grouped. The third time range 1104 may be divided into subdivisions like described with reference to the first time range 904. In various embodiments the subdivisions may comprise a first subdivision A, a second subdivision C, a third subdivision B, and a fourth subdivision D. Photons of the third set of photons may be grouped according their time of flight which may be determined with reference to their emission. And the grouping of the photons may be used to determine a fourth time range, which may comprise the process described with reference to FIG. 9. In various embodiments it may be determined from the photon count that the peak is most likely to be found in a first quadrant 1104A, a second quadrant 1104B, a third quadrant 1104C, or a fourth quadrant 1104D of the third time range. The fourth time range may centered around the midpoint of the quadrant determined to be the most likely location of the peak.

Figure 12:
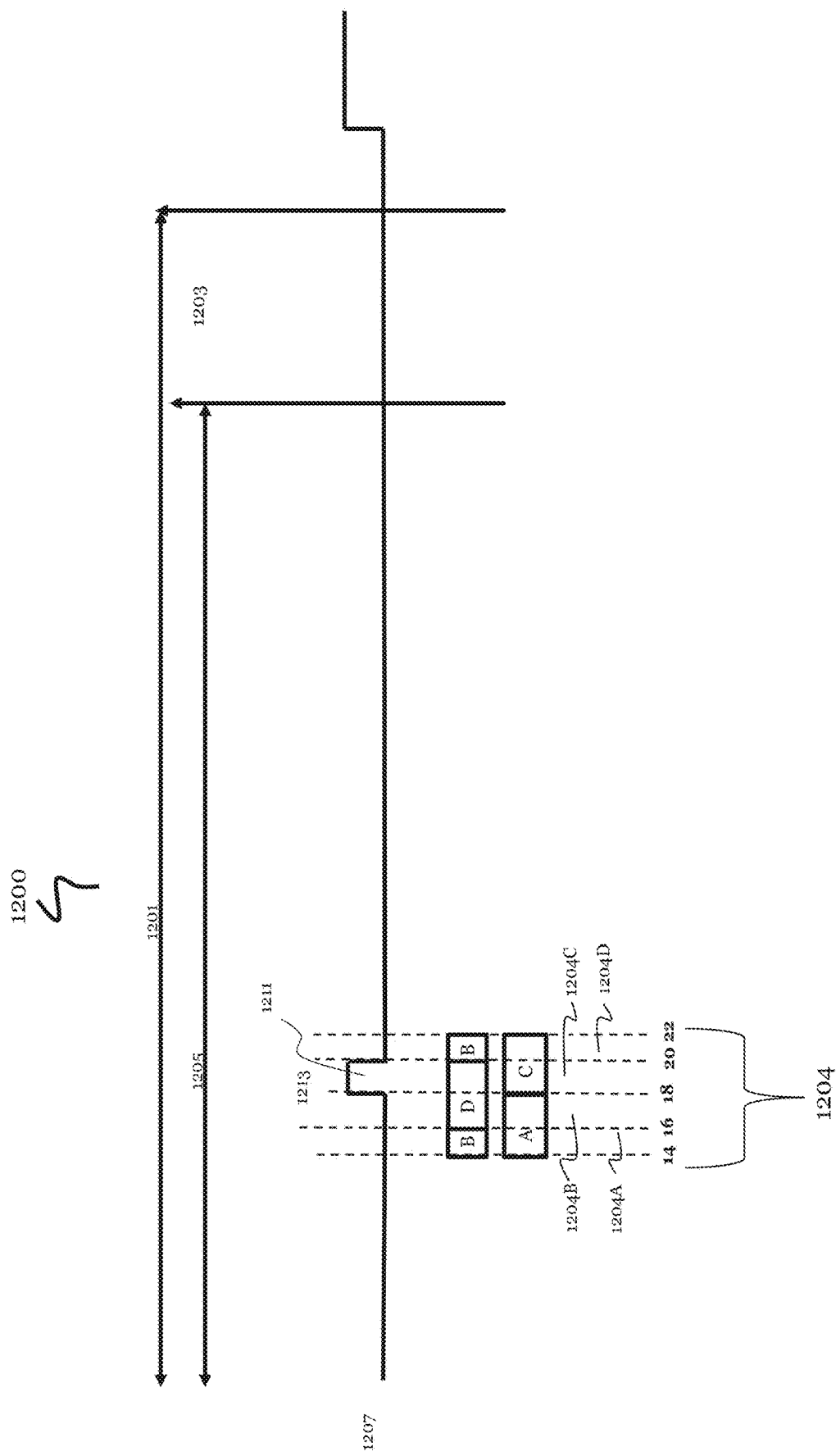
FIG. 12 depicts a fourth step to determine a peak position of an embodiment.

FIG. 12 depicts a fourth step 1200 to determine a peak position.

Using the photon count from the preceding step (as depicted in FIG. 11), a fourth time range 1204 may be determined to be centered 1213 at the $18^{th}$ nS. A fourth set of photons emitted may be detected during the fourth time period. The fourth time period may comprise a series of optical pulses. The interval 1211 of photon count 1207 may correspond to the duration of an optical pulse (or series of optical pulses) of the fourth time period. The duration of the optical pulse (or series of optical pulses) of the fourth time period may decrease relative to the duration of the optical pulse of the preceding time period. In various embodiments, the interval 1211 may comprise 2 nanoseconds, like depicted in FIG. 12 (half the duration of the interval 1111 depicted in FIG. 11). Photons detected during the fourth period having times of flight falling within the fourth time range 1204 may be counted and grouped. The fourth time range 1204 may also be divided into subdivisions. In various embodiments the subdivisions may comprise a first subdivision A, a second subdivision C, a third subdivision B, and a fourth subdivision D. Photons of the fourth set of photons may be grouped according their times of flight which may be determined with reference to their emission. And, the grouping of the photons may be used to determine a fifth time range, which may comprise the process described with reference to FIG. 9. In various embodiments, the photon count for the fourth time period may indicate that the peak is most likely to fall within a quadrant 1204A, a second quadrant 1204B, a third quadrant 1204C, or a fourth quadrant 1204D of the fourth time range 1204. It should be noted that divisions between the quadrants in FIG. 12 are represented in nanoseconds. But, due to space limitations, the term "nS" has been removed. A count for the fifth time period using the fifth time range may then be used to determine a sixth time range for a sixth time period. And, additional, progressively refined, time ranges may be found. This may be continued as long as desirable and the last time range found may be used as an estimate for the peak time interval.

Various embodiments may comprise additional steps to identify a specific location of the photon peak within the peak time interval. This may comprise a fractional value, which may be negative, that is summed with a center position of the peak time interval to provide a location of the photon peak within the peak time interval. This may be accomplished by processing data collected during a final step.

Figure 13:
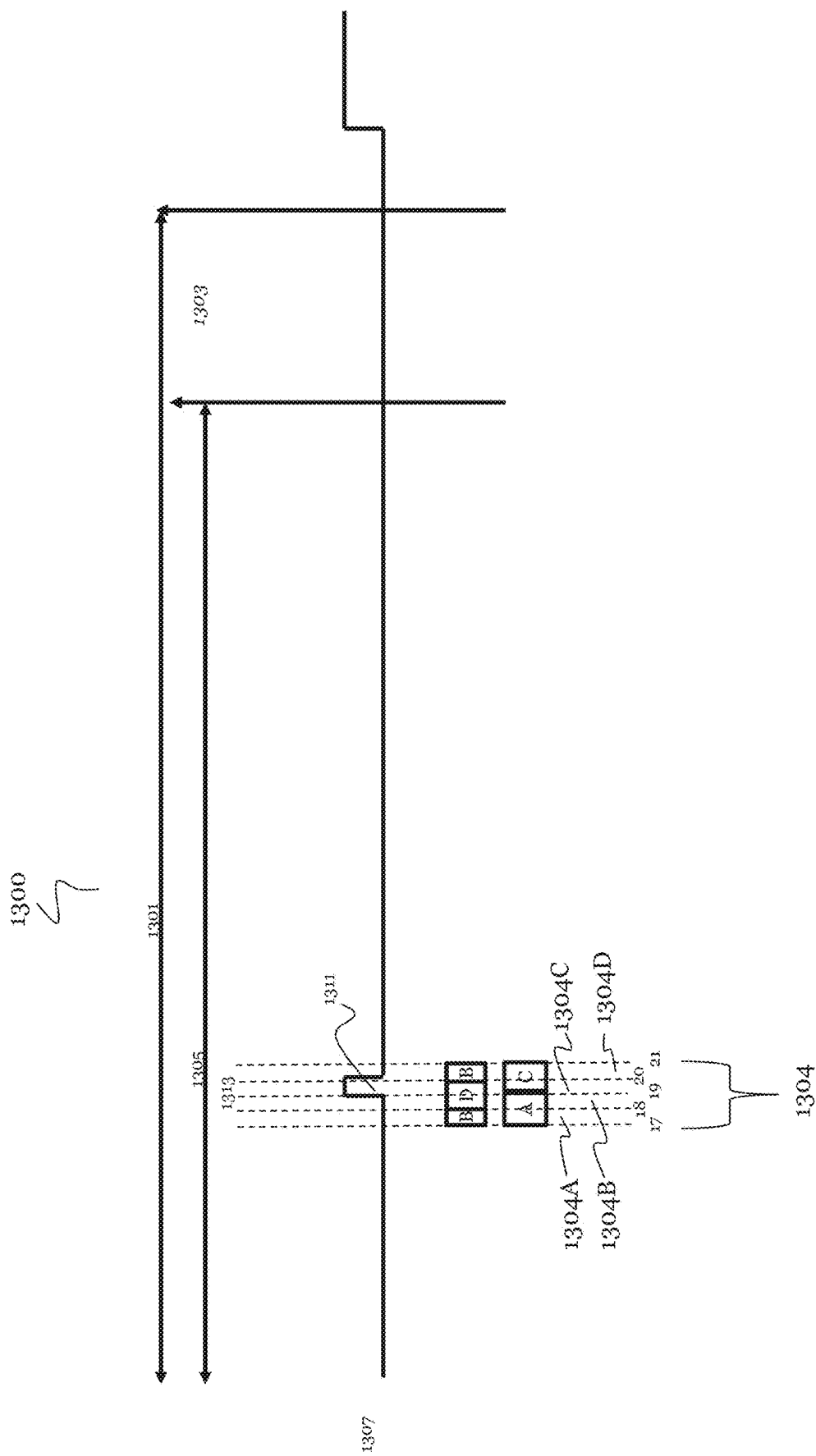
FIG. 13 depicts a final step to determine a peak position of an embodiment.

FIG. 13 depicts a final step 1300 to determine a peak position.

The photon count from the penultimate sample may be used to determine a final time range 1304. In various embodiments, as with preceding time ranges, the final time range 1304 may be determined by using the region of the preceding time range where the peak is most likely to be located as a reference to center the final time range 1304. When at the final step, the region of the preceding time range where the peak is most likely to be located may comprise the peak time interval. For centering the final time range, if the preceding estimate of the peak time interval is the 18$^{th}$ nanosecond to the 20$^{th}$ nanosecond (as depicted in the example in FIG. 12), the final time range may be centered 1313 at the 19$^{th}$ nanosecond after the emission.

The interval 1311 of photon count 1307 may correspond to the duration of an optical pulse (or series of optical pulses) of the final time period. The duration of the optical pulse (or series of optical pulses) may comprise a subset of the final time range. And, it may be less than the duration of the optical pulse of the preceding range. In various embodiments, the interval 1311 may comprise 1 nanosecond, like depicted in FIG. 13 (half the duration of the interval 1211 depicted in FIG. 12). And, the time range may comprise 4 nanoseconds. However, the duration of the interval 1311 and the final time range may vary in different embodiments.

The final time range 1304 may be divided into subdivisions and photons having times of flight falling within the subdivisions may be counted accordingly. In various embodiments the subdivisions may comprise a first subdivision A, a second subdivision C, a third subdivision B, and a fourth subdivision D. Photons of the final set of photons may be grouped in the appropriate subdivision according their times of flight which may be determined with reference to their emission. The first subdivision A may comprise the first half of the final time range, the second subdivision C may comprise the second half of the final time range, the third subdivision B may comprise the first quadrant and last quadrant of final time range, and the fourth subdivision D may comprise the middle two quadrants of the final time range.

The photon count generated during the final step may be used to determine the location of the photon peak within the final time range. For example, if the the peak time interval was a 2 nanosecond range, a final time range may comprise a 4 nanosecond time range centered around the peak time interval. And, a photon count of the 4 nanosecond time range may be utilized to determine the position of the peak within the peak time interval. In various embodiments the final time range may be twice the duration of the peak time interval, which in turn may be twice the final optical pulse (or series of optical pulses) In various embodiments it may be advantageous for the duration of the final optical pulse (or series of optical pulses) to be 50% of the final time range. The duration of the optical pulse (or series of optical pulses) may fall in a range of 25% to 75% of the final time range, in various embodiments). In various embodiments, the calculated location of the peak photon position may fall in a range between −PI and +PI of the center of the time range. In various embodiments, the final time range may span −2 Ns to +2 Ns around the center as depicted in FIG. 13.

In various embodiments, the location of the peak position within the peak-time interval may determined by calculating a Shift Value and subtracting the Shift Value (which may be negative) from the center of the peak-time interval. In various embodiments, the Shift Value may be calculated using trigonometric functions.

In various embodiments, the location of the peak photon position within the peak time interval may be derived by using Equation 1 to find a shift value.

$$\text{Shift Value} = \text{ArcTan}\left(\frac{A-C}{B-D}\right) \quad \text{Equation 1}$$

In Equation 1, A represents the photon count of the first subdivision A, C represents the photon count of the second subdivision C, B represents the photon count of the third subdivision B, and D represents the photon count of the fourth subdivision D.

The Shift Value may also be adjusted according to additional conditions. If B-D is a negative value and A-C is also negative, the Shift Value may be reduced by π. If B-D is a negative value and A-C is greater than or equal, to zero the Shift Value may be increase by a. If B-D is equal to zero and A-C is negative, the shift is equal to −π/2. If B-D is equal to zero and A-C is greater than or equal to zero the Shift Value is equal to π/2. If B-D is greater than zero, the Shift Value may remain as calculated in Equation 1 without any adjustment.

After adjustments, if necessary, from the previous paragraph, the location of the peak photon position within the peak time interval may be described by Equation 2.

$$\text{Location=Peak Bin−Shift Value}*2/\pi \quad \text{Equation 2}$$

In equation 2, the Peak Bin may be a numeral assigned to a bin comprising the peak time interval estimate. The Peak Bin may comprise the center of the final time range. In various embodiments, the Peak Bin may always be an odd numbered bin. The second term of Equation 2 (Shift Value*2/π) may convert the Shift Value from radians into the bin unit. For example, using the example from FIG. 13, the Peak Bin may be 19th bin (or 19$^{th}$ nanosecond in this example). If the shift position is calculated to be π/4, the Position is set to 18.5 (19 minus ½). The location calculated from Equation 2 may be in terms of the bin size. It should be appreciated, in various embodiments; the bin size may not correspond to a one nanosecond range, as in the example depicted in FIG. 13. For example, the bin size may be equal to 500 picoseconds, 2 nanoseconds or any other time range. Consequently, it may be advantageous to convert the bin position into time.

In various embodiments the bin size may equal the one quarter of the final time range. In various embodiments, the bin size may equal the size of the final optical pulse (or series of optical pulses). In various embodiments, the bin size may correspond to the smallest time range where a photon count may be performed. A processor 126 may receive the peak time interval from the time period preceding the final time period. The processor 126 may also receive, from a radiation-sensitive pixel, the photon counts from the final time period for the first subdivision A, second subdivision C, third subdivision B, and fourth subdivision D. The processor 126 may then perform the calculations of Equation 1, the Shift Value adjustment, if necessary, and the calculation of Equation 2. As will be appreciated, the location calculated from Equation 2 will correspond to a distance of an object from where the photons are reflected. The distance may be calculated from the position calculated from Equation 2. The memory 132 may comprise an instruction set that, when executed, causes the processor 126 to perform the calculations of Equation 1, the adjustments of the Shift Value, and calculations of Equation 2. An instruction set may also cause the processor, when executed, to calculate a distance of an object from a Time of Flight system based on the location of a photon peak calculated from Equation 2.

In various embodiments, Equation 1 and Equation 2 may be used to calculate the location of a photon peak within a peak time interval calculated from a full histogram as depicted in FIG. 3. A processor 126 may receive a full histogram of data from an optical receiver 104. The histogram data may comprise a photon count binned according to their time of flight relative to the emission of the photons. The processor may identify a peak-time interval based on the histogram. It may be advantageous to calculate a location of the photon peak within the peak time interval based on the histogram. This may allow a more precise identification of the photon peak, which in turn may allow the distance of an object from a ToF system to be determined more precisely. And, Equation 1 and Equation 2 may be used to find a location of a photon peak within a peak time interval based on a full histogram.

For example, if the peak time interval based on a full histogram comprises a 2-nanosecond range, and the bin width is 1 nanosecond, the 4 bins centered around the center of the 2 nanosecond peak time estimate may be divided into overlapping subdivisions for calculating the according to Equation 1. These four bins may correspond to the subdivisions of the final time range described with reference to FIG. 13. As an example, if the peak-time interval is identified as the $16^{th}$ bin and the 17 bin, the first subdivision A may comprise the $15^{th}$ bin and the $16^{th}$ bin, the second subdivision C may comprise the $17^{th}$ bin and the $18^{th}$ bin, the third subdivision B may comprise the $15^{th}$ bin and the $18^{th}$ bin, and the fourth subdivision D may comprise the $16^{th}$ bin and the $17^{th}$ bin. The photon counts for the subdivisions can be retrieved from the histogram data to calculate the Shift Value from Equation 1. The Shift Value may be adjusted as described above, depending on the photon counts of the subdivisions, and then used in Equation 2. The Peak Bin in Equation 2 may comprise the center of the peak time estimate identified by the processor from the histogram, which in the current example the $17^{th}$ bin. The memory 132 may comprise an instruction set that, when executed, causes the processor to perform the calculations of Equation 1, the adjustments of the Shift Value, and calculations of Equation 2. An instruction set may also cause the processor, when executed, to calculate a distance of an object from a Time of Flight system based on the position of a photon peak calculated from Equation 2.

As will be appreciated, photon-count data may be collected from a series of optical pulses. The duration of the optical pulses of the series of the optical pulses may be a subset of the final time range meaning the duration of the optical pulses of the series of optical pulses is less than the final time range.

Figure 14:
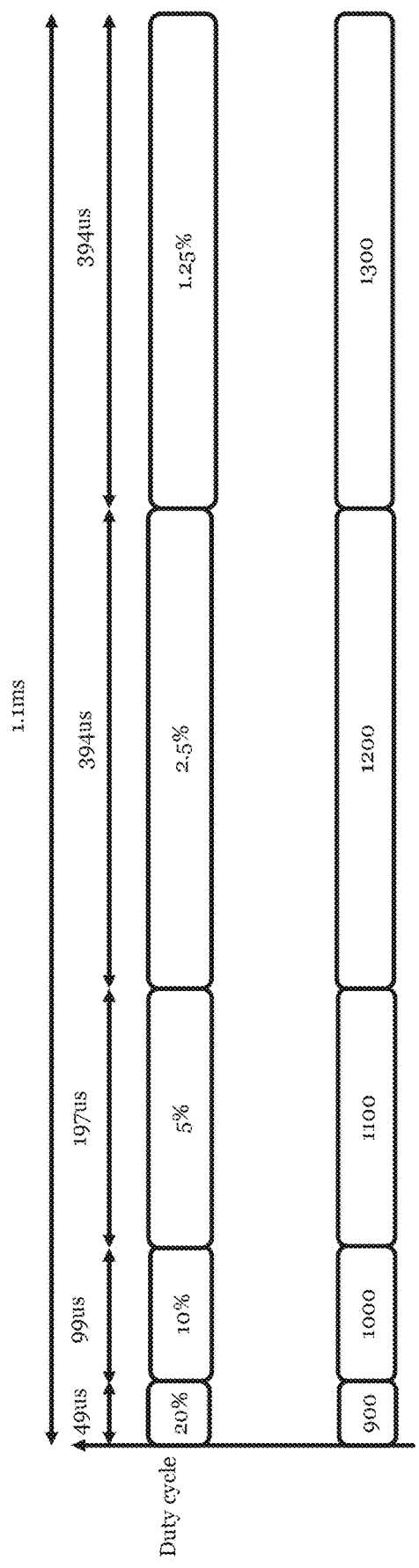
FIG. 14 depicts a timing diagram for the steps to determine a peak position of an embodiment.

FIG. 14 depicts an example timing diagram for duration of the steps to determine a peak position.

In various embodiments, the duration of the optical pulses used to reflect photons of objects in an environment may decrease as the time ranges searched for the peak decreases. In may be advantageous to maintain a desired signal to noise ration to compensate for the decrease in the duration of an optical pulse by increasing the time period for sampling as the number of steps progress. For example, at a first step 900 a first optical pulse may comprise a duty cycle of 20%. And, in various embodiments, time period for sampling may occur at the first optical pulse for 49 microseconds. At a second step 1000, the duty cycle may be halved to 10%. And the time period for sampling may be approximately doubled to 99 microseconds. At a third step 1100, the duty cycle may again be halved to 5% while the sampling period may again be approximately doubled to 197 microseconds. At a fourth step 1200, the duty cycle may be 2.5% and the sample time may be doubled to 394 microseconds. At a fifth step, which may also include processing for finding a location of the photon peak within the peak time interval, the duty cycle may be reduced to 1.25% and the time period for sampling may be held constant at 394 microseconds. The time period of the final step may impact the quality and accuracy of the computation to find the position of the photon peak within the peak time interval so the time period for sampling may be the same as the previous step. In various embodiments, the time periods, duty cycles, and optical-pulse duration may be different than the example described with reference to FIG. 14

Figure 15:
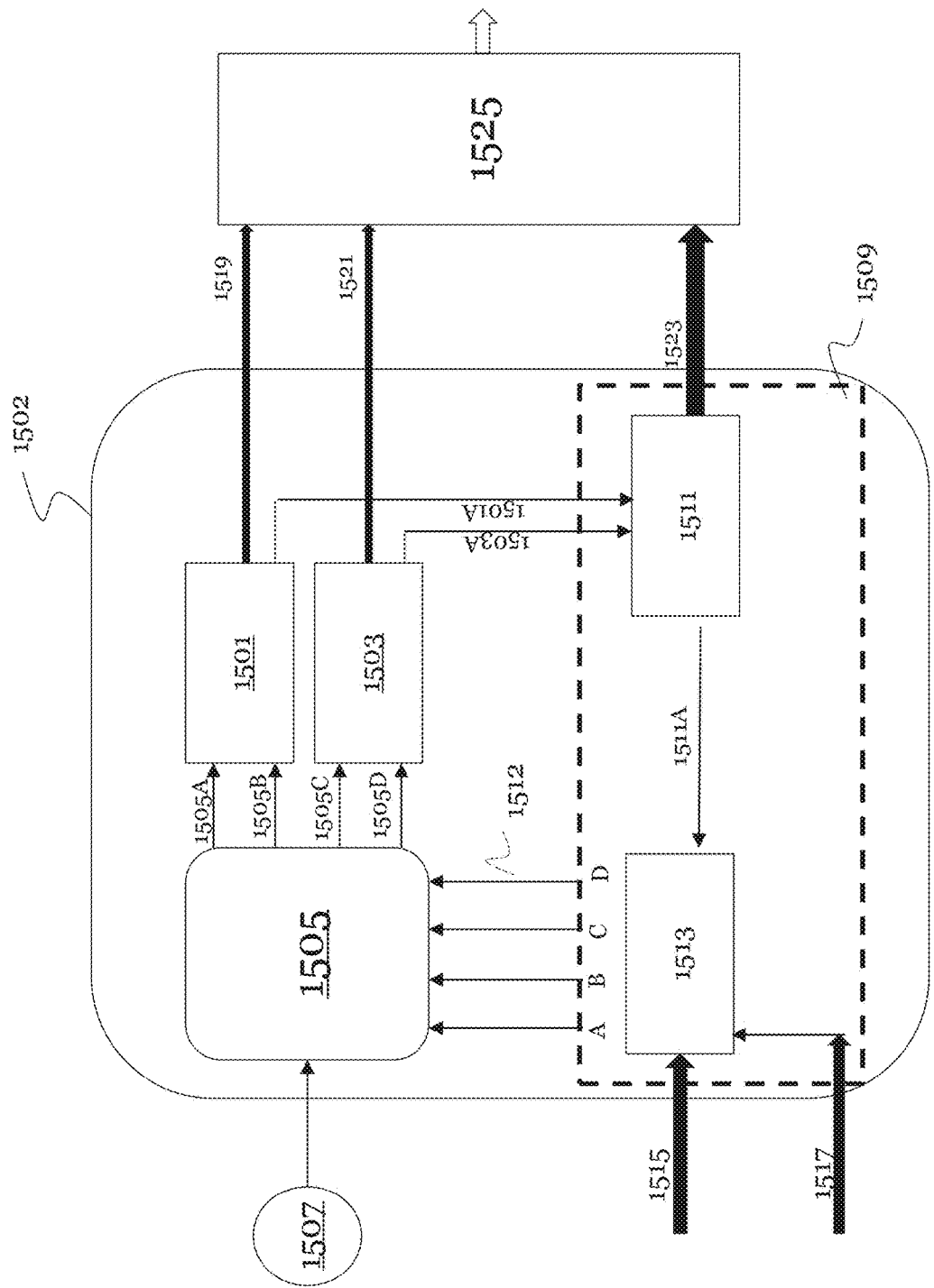
FIG. 15 depicts a device to detect a peak time interval in accordance with an embodiment.

FIG. 15 depicts a device 1502 to detect a peak time interval.

In various embodiments a device 1502 to detect a peak time interval may be used to group and count photons and adjust a time range for subsequent steps based on the counting and grouping.

In various embodiments, a device 1502 to detect a peak time interval may comprise a first counter 1501. In various embodiments, the first counter 1501 may comprise an up down counter. The first counter 1501 may be configured to increment a first count each time a first-counter increment command 1505A is received. In various embodiments, the first counter 1501 may also be configured to decrement the first count each time a first-counter decrement command 1505B is received.

In various embodiments, a device 1502 to detect a peak time interval may comprise a second counter 1503. The second counter 1503 may comprise an up down counter. The second counter 1503 may be configured to increment a second count each time a second-counter increment command 1505C is received. In various embodiments, the second counter 1503 may also be configured to decrement the second count each time a second-counter decrement command 1505D is received.

In various embodiments, a device 1502 to detect a peak time interval may further comprise a gate circuit 1505. The gate circuit may be configured to receive a photon-detection alert (photon event) from a radiation-sensitive pixel 1507. In various embodiments, the radiation-sensitive pixel 1507 may comprise a SPAD. The radiation-sensitive pixel 1507 may comprise one pixel of an optical receiver. In various embodiments, the gate circuit 1505 may receive a photon-detection alert each time a photon is detected by the radiation-sensitive pixel 1507.

In various embodiments, the gate circuit 1505 may comprise a first state wherein the gate circuit 1505 transmits a first-counter increment command 1505A to the first counter 1501 each time the photon-detection alert is received. The gate circuit 1505 may also comprise a second state wherein the gate circuit 1505 transmits the first-counter decrement command 1505B command to the first counter 1501 each time the photon-detection alert is received.

In various embodiments, the gate circuit 1505 may comprise a third state wherein the gate circuit 1505 transmits a second-counter increment command 1505C to the second counter 1503 each time the photon-detection alert is received. The gate circuit 1505 may also comprise a fourth state wherein the gate circuit 1505 transmits the second-counter decrement command 1505D command to the second counter 1503 each time the photon-detection alert is received. In various embodiments, the gate circuit 1505 may comprise more or less states. And, in various embodiments, different command signals may be transmitted during respective states.

The gate circuit 1505 may be set to the first state, second state, third state, or fourth state to correspond with the first subdivision A, the second subdivision B, the third subdivision C or the fourth subdivision D of any of the steps for determining a peak position. For example, the gate circuit 1505 may be set to the first state during the first subdivision A. This may allow the gate circuit 1505 to deliver a first-counter increment command 1505A to the first counter 1501 each time the radiation-sensitive pixel 1507 detects a photon during the first subdivision A. The gate circuit 1505 may be set to the second state during the second subdivision C. This may allow the gate circuit 1505 to deliver a first-counter decrement command 1505B to the first counter 1501 each time the radiation-sensitive pixel 1507 detects a photon during the second subdivision C. By incrementing and decrementing the first count the first counter 1501 can track whether more photons are detected in the first subdivision A or the second subdivision C and track the difference between the photon count for the first subdivision A and the second subdivision C.

Similarly, the gate circuit 1505 may be set to the third state during the third subdivision B. This may allow the gate circuit 1505 to deliver a second-counter increment command 1505C to the second counter 1503 each time the radiation-sensitive pixel 1507 detects a photon during the third subdivision B. The gate circuit 1505 may be set to the fourth state during the fourth subdivision D. This may allow the gate circuit 1505 to deliver a second-counter decrement command 1505D to the second counter 1503 each time the radiation-sensitive pixel 1507 detects a photon during the fourth subdivision D. By incrementing and decrementing the second count the second counter 1503 can track whether the more photons are detected during the third subdivision B or the fourth subdivision D track the difference between the photon count for the third subdivision B and the fourth subdivision D.

It may be advantageous to utilize up/down counters to track photon counts because it may save space that otherwise may be needed to have additional counters to individually track a photon count for each subdivision. Utilizing counters in this way may also be advantageous because, in various embodiments, they may allow a count to be tracked without allocating storage for each bin of a ranging period 905. An up/down count may also prove advantageous to counter photons detected due to noise in an environment. In various embodiments, other counters may be used.

In various embodiments, the device 1502 to detect a peak time interval may comprise more or less counters. A device 1502 to detect a peak time interval may comprise only one counter in various embodiments wherein ranging periods are divided into only two subdivisions. In various embodiments, a device 1502 to detect a peak time interval may comprise more than two counters wherein ranging periods are divided into more than 4 subdivisions. In various embodiments, the device 1502 may comprise one counter for each subdivision.

The gate circuit 1505 may also comprise a decoder circuit 1509 configured to receive the first count 1501A from the first counter and the second count 1503A from the second counter 1503. The decoder circuit 1509 may be configured to decode the first count 1501A and the second count 1503A to determine the peak time interval. As will be appreciated, in various embodiments, different decoding schemes may be used. The decoder circuit 1509 may also be configured to receive a global-step signal 1517 that communicates a step number.

In various embodiments, the global-step signal may determines: a duration of a first-state period wherein the gate circuit 1505 is set to the first state; the duration of a second-state period wherein the gate circuit 1505 is set to the second state; the duration of a third-state period wherein the gate circuit 1505 is set to the third state; and the duration of a fourth-state period wherein the gate circuit is set to the fourth state. The global-step signal may determine the duration of the time period for a photon count.

The decoder circuit 1509 may also be comprised to receive a timing signal 1515. In various embodiments the timing signal 1515 may communicates an optical-emission time by an optical emitter 102-1 of an optical source 102. In various embodiments, the timing signal may communicate a clock signal shared by an optical emitter 102-1 and the gate circuit 1505 for synchronization. In various embodiments, the timing signal 1515 may comprise the timing signal 130 of an optical system 100.

The decoder circuit 1509 may be configured to deliver a control signal 1512 to the gate circuit 1505. The control signal may 1512 may set the gate circuit 1505 to the first state, the second state, the third state and the fourth state. In various embodiments, the control signal 1512 may be split into a first signal A to set the gate circuit 1505 to the first state, a second signal B to set the gate circuit 1505 to the second state, a third signal C to set the gate circuit 1505 to the third state, and a fourth signal D to set the gate circuit 1505 to a fourth state. The decoder circuit may determine a time range based on the first count 1501A and the second count 1503A.

In various embodiments, the device 1502 to detect a peak time interval may comprise an initial setting for a first step to detect a peak time interval. The first counter 1501 and the second counter 1503 and their corresponding counts may be reset to an initial value. The decoder circuit 1509 may store a value that identifies the center of a first time range. For example, for a 64 nanosecond time range, the decoder circuit 1509 may store a center value indicating that the center of the time range is the $32^{nd}$ nanosecond after the emission of an optical pulse. This value may be changed during the steps to identify a peak time period and used as a reference for establishing subsequent time ranges. The center value may be reset, for example to the $32^{nd}$ nanosecond, when there is a reset. Resets may occur after a predetermined number of steps or upon reception of a reset signal. It should be appreciated, various embodiments may also comprise a blanking time.

Continue with the example from the preceding paragraph, for the first step, the decoder circuit 1509 may be configured to deliver a control signal to the gate circuit 1505 to set the gate circuit 1505 to the first state, the second state, the third state and the fourth state to correspond to a first subdivision A of the first time range, a second subdivision C of the first time range, a third subdivision B of the first time range, and a fourth subdivision D of the fourth time range. The duration of the time period may be established by initial settings. Photons having times of flight within the first time range that are detected during the first time period will trigger the first counter 1501 and the second counter 1503 to increment or decrement their respective counts based on the when the photons were detected. The first time period may comprise multiple optical pulses and the gate circuit may be set to the first state, the second state, the third state, and the fourth state for each optical pulse of the time period.

The decoder circuit 1509 may then use the first count 1501A and the second count 1503A to determine a second time range. For example, in various embodiments, when the first count 1501A is greater than zero and the second count 1503A is greater than zero, the region where the peak time is most likely to be located may be decoded by the decoder circuit 1509 as being in a second quadrant of the first time range. In various embodiments, when the first count 1501A is greater than zero and the second count 1503A is less than zero, the region where the peak time is most likely be located may be decoded as being in a first quadrant. In various embodiments, when the first count 1501A is less than zero and the second count 1503A is greater than zero, the region where the peak time is most likely be located may be decoded as being in a third quadrant in various embodiments, when the first count 1501A is less than zero and the second count 1503A is less than zero, the region where the peak time is most likely be located may be decoded as being in a fourth quadrant. In various embodiments the first count 1501A and the second count 1503A may just communicate the sign of their respective counts.

Based on the first count 1501A and the second count 1503A, the decoder circuit 1509 may determine a time range for a subsequent photon count. In various embodiments, this may be accomplished by shifting a stored value indicating the center of a time period. For example, in an embodiment wherein an initial setting establishes a center of a 64 nanosecond first period as being the $32^{nd}$ nanosecond after optical pulse emission, and the region where the peak time is most likely be located is determined to comprise a second quadrant of the 64 nanosecond time period, a second time range may be established by shifting the center value to the midpoint of the second quadrant, the $24^{th}$ nanosecond. Then, depending on the duration determined for the next step (by the global-step signal or predetermined value) the time range may be established by the center value. For example, if next time period has a duration of 32 nanoseconds, the span of the time range may comprise the $8^{th}$ nanosecond to the $40^{th}$ nanosecond, which is centered at the $24^{th}$ nanosecond.

In various embodiments, the duration of the time ranges may be predetermined. For example, the duration may be halved each step. In various embodiments, a global-step signal 1517 may communicate the step to the decoder circuit 1509. However, in various embodiments, the decoder circuit 1509 may comprise circuitry to track the steps after a reset.

The decoder circuit 1509 may deliver control signals to the gate circuit 1505 set the gate circuit 1505 to the appropriate states according the time range. For example, the decoder circuit 1509 may deliver a control signal to the gate circuit 1505 after passage of a first-state delay that is measured from the emission of an optical pulse. The first-state delay may comprise the time between emission of an optical pulse and initiation of the first subdivision of a corresponding time range. Likewise, after passage of a second-state delay the decoder circuit 1509 may deliver a signal to the gate circuit 1505 to set the gate circuit 1505 to the second state. After passage of a third-state delay, the decoder circuit 1509 may deliver a signal to the gate circuit 1505 to set the gate circuit 1505 to the third state. After passage of a fourth-state delay the decoder circuit 1509 may deliver a signal to the gate circuit 1505 to set the gate circuit 1505 to the fourth state. In various embodiments, the duration of the subdivisions may be determined by the global-step signal. In various embodiments, the duration of the subdivisions may be predetermined on a step-by-step basis.

In various embodiments, the decoder circuit 1509 may comprise a register 1511 that stores the center value of a time range and updates the center position based on the first count 1501A and second count 1503A. The timing signal 1515 may communicate the center position by a signal 1515A to a subdivision-decoder logic circuit 1513 that determines when to set the gate circuit 1505 to first state, the second state, the third state, and the fourth state. This may be determined with reference to timing signal 1515 that may communicate the timing of an optical emission and a global-step signal 1517 that may determine the duration of the time period, subdivisions, or both.

In various embodiments, the first counter 1501 may transmit, by a signal 1519, results of the first count from a final step to a processor 1525. The second counter 1503 may transmit results of the second count from a final step, by a signal 1521, to a processor 1525. The processor 1525 may use the count to find the position of a photon peak within a peak time interval. The final step register may also transmit the center position of a final estimate of the peak time interval to the processor by a signal 1523. The processor may then calculate the position of the photon peak within the peak time interval. And, generate a distance of an object based on the location of the peak time interval.

Figure 16:
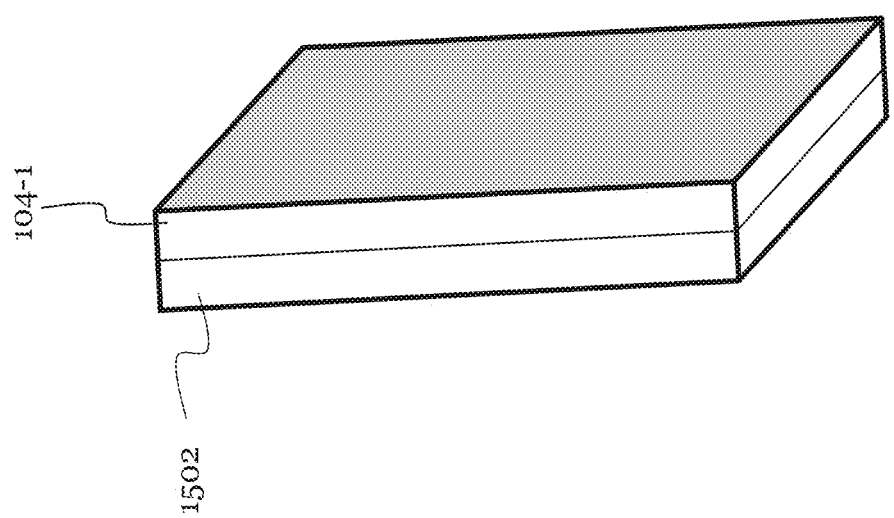
FIG. 16 depicts a radiation-sensitive pixel comprising a device to detect a peak time interval in accordance with an embodiment.

FIG. 16 depicts a radiation-sensitive pixel comprising a device to detect a peak time interval.

In various embodiments, a radiation-sensitive pixel 104-1 may be paired with a device 1502 to detect a peak time interval In various embodiments, each radiation-sensitive pixels 104-1-104-*kk*, of an optical receiver 104 as depicted in FIG. 2*b* may be paired with a device 1502 to detect a peak time interval.

Figure 17:
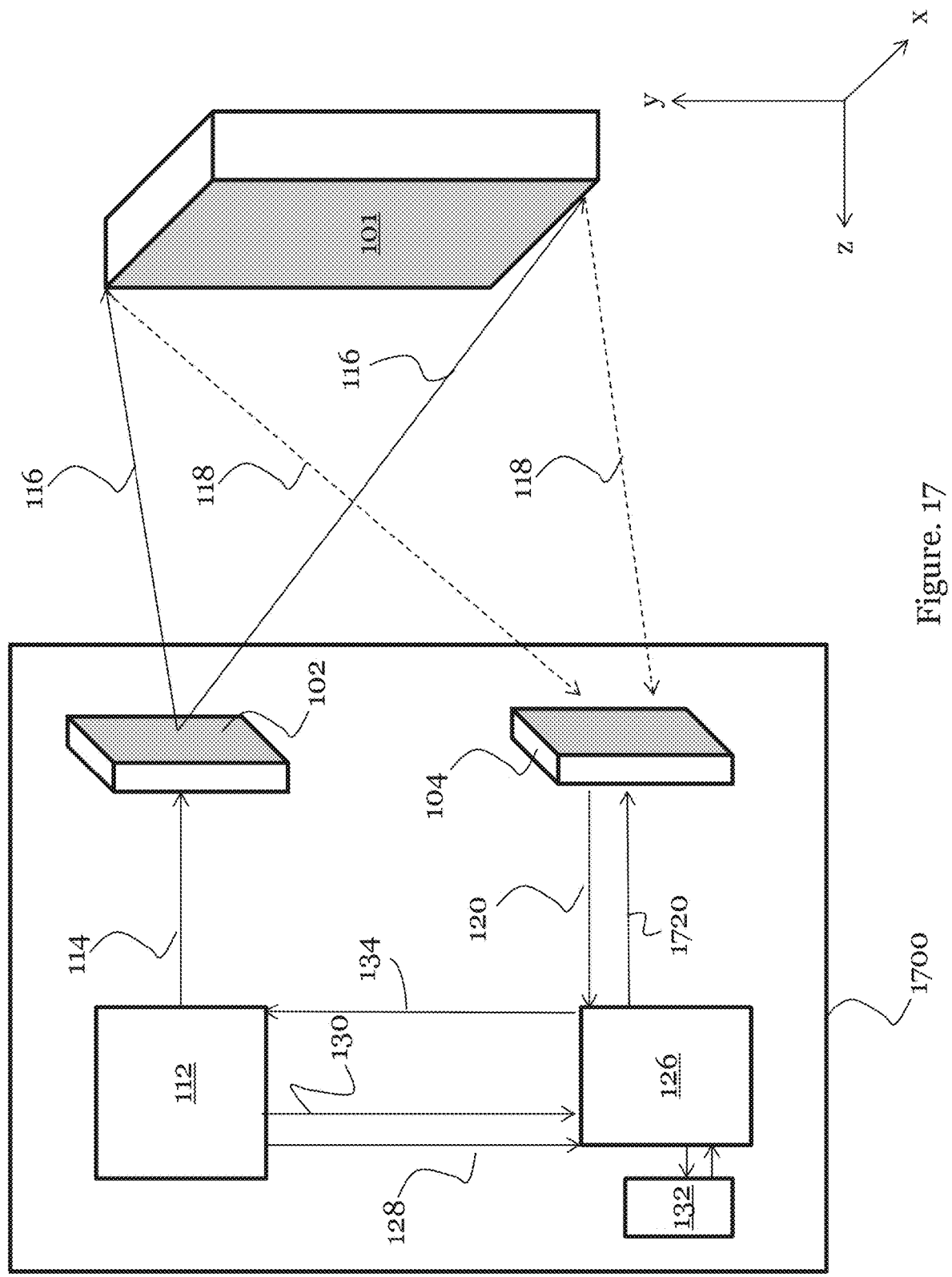
FIG. 17 depicts an optical system with an optical receiver comprising devices to detect peak time interval position in accordance with an embodiment.

FIG. 17 depicts an optical system with an optical receiver comprising devices to detect peak time interval.

An optical system 1700 may comprise an optical receiver 104 that comprises radiation-sensitive pixels 104-11 to 104-NN wherein some or all of the radiation-sensitive pixels are paired with devices 1502 to detect peak time interval. By utilizing the devices 1502 to detect peak time intervals, the optical system 1700 may generate distance information about an object 101 without transmitting histogram data for each pixel of the optical receiver 104 to the processor 126. In various embodiments, the optical receiver 104 may transmit the peak time intervals determined by the devices 1502 paired with each of the plurality of radiation-sensitive pixels 104-11 to 104-NN. In various embodiments, the processor 126 may transmit a signal 1720 that may comprise timing signals 1515 and global-step signals 1517 for the devices 1502 to detect peak time intervals. The processor 126 may also comprise the processor 1525 for calculating a location of the photon peak within the peak time interval.

Figure 18:
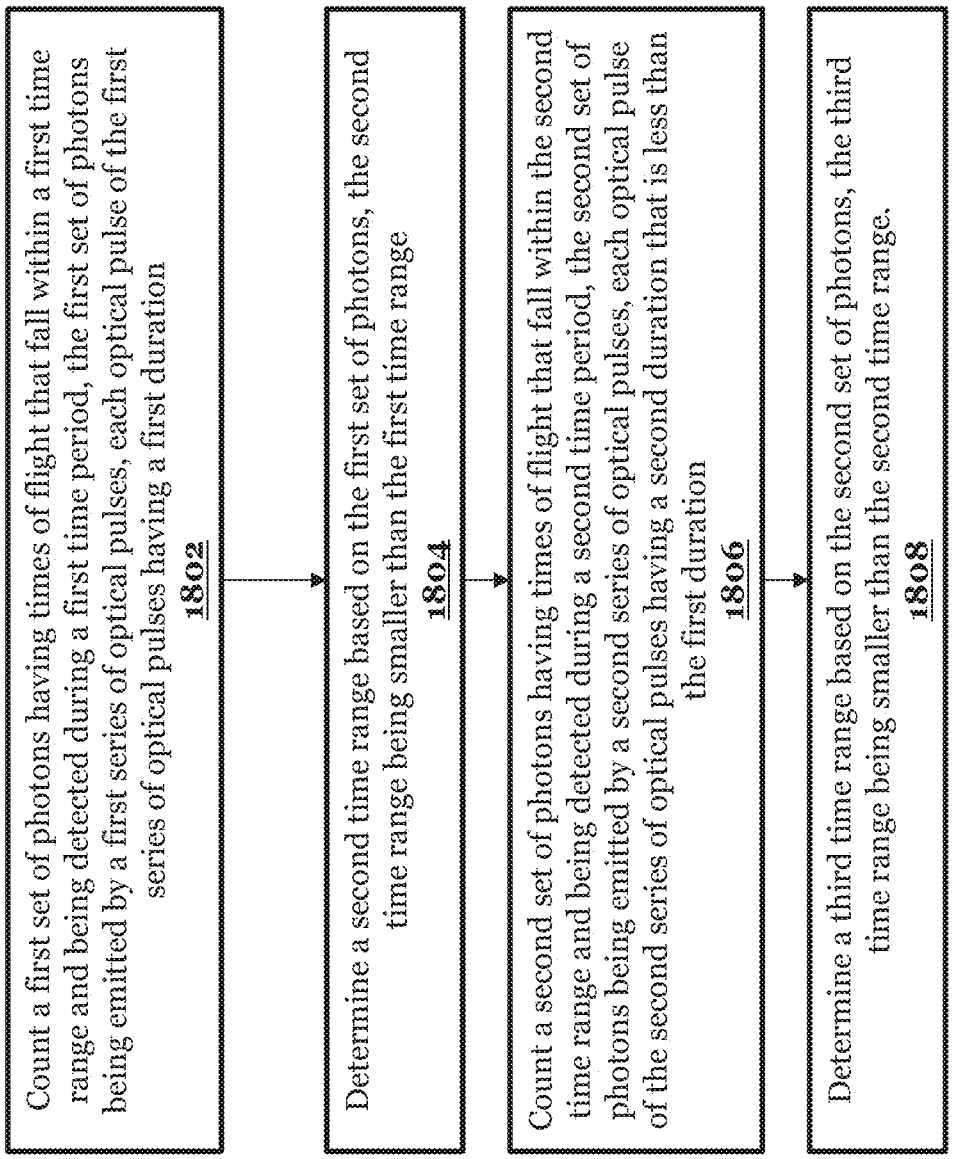
FIG. 18 depicts a flow chart illustrating a method in accordance with an embodiment.

FIG. 18 depicts a flow chart illustrating a method 1800.

In various embodiments, the method 1800 comprises: at a step 1802, counting a first set of photons having times of flight that fall within a first time range and being detected during a first time period, the first set of photons being emitted by a first series of optical pulses, each optical pulse of the first series of optical pulses having a first duration; at a step 1804, determining a second time range based on the first set of photons, the second time range being smaller than the first time range; at a step 1806, counting a second set of photons having times of flight that fall within the second time range and being detected during a second time period, the second set of photons being emitted by a second series of optical pulses, each optical pulse of the second series of optical pulses having a second duration that is less than the first duration; and at a step 1808, determining a third time range based on the second set of photons, the third time range being smaller than the second time range.

In various embodiments, the method 1800 may further comprise, wherein the first series of optical pulses is emitted by an optical emitter.

In various embodiments, the method 1800 may further comprise, wherein the first set of photons and the second set of photons are detected by an optical receiver.

In various embodiments, the method 1800 may further comprise, wherein the first set of photons is used to center the second time range.

In various embodiments, the method 1800 may further comprise, further determining a final time range based on a set of photons having times of flight that fall within a preceding time range and being detected during a preceding time period; counting a final set of photons having times of flight that fall within the final time range and being detected during a final time period, the final set of photons being emitted by a final series of optical pulses, each optical pulse of the final series of optical pulses having a final duration; and calculating a location of a peak photon position within the final time range based on the final set of photons.

Figure 19:
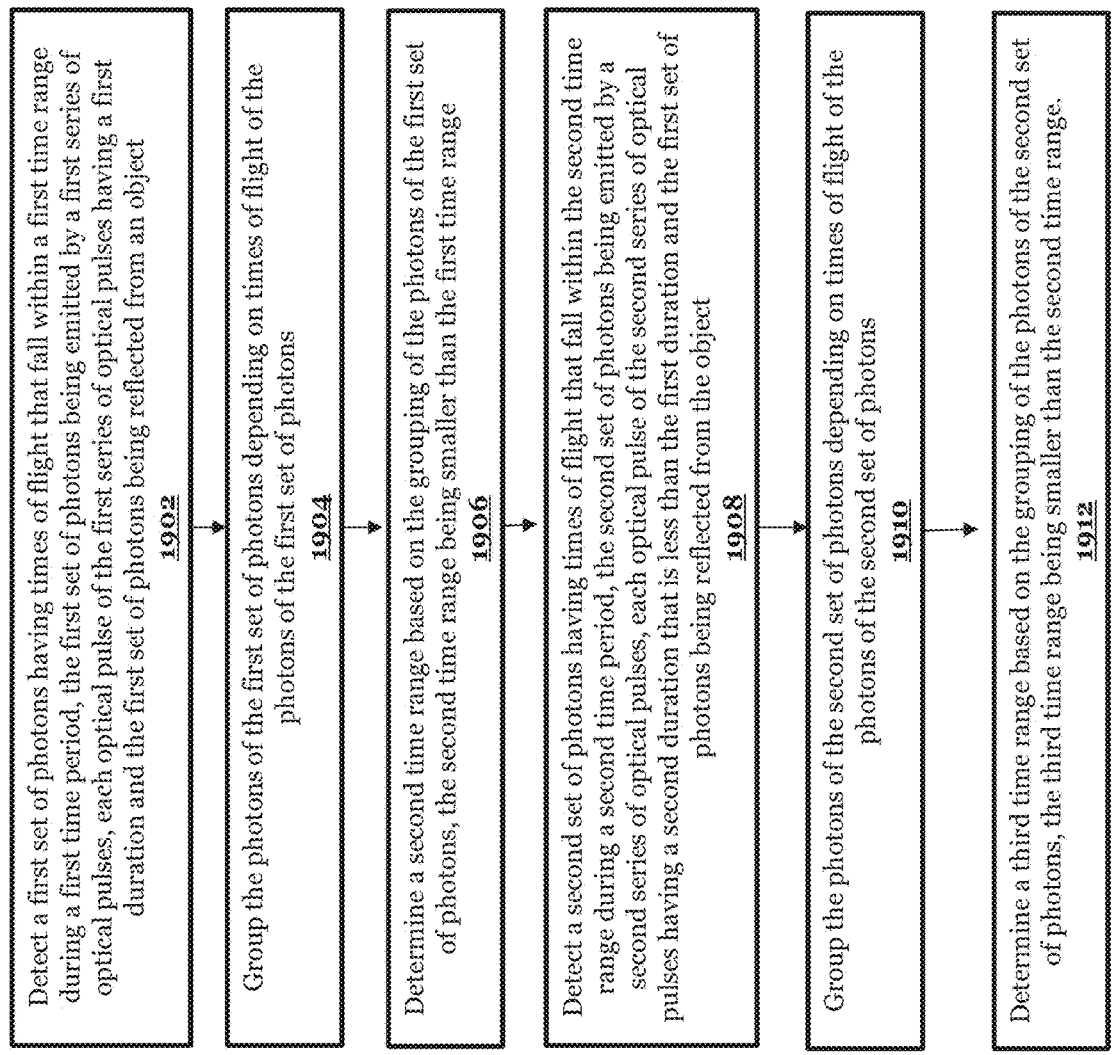
FIG. 19 depicts a flow chart illustrating a method in accordance with an embodiment.

FIG. 19 depicts a flow chart illustrating a method 1900.

In various embodiments, the method 1900 may comprise: at a step 1902, detecting a first set of photons having times of flight that fall within a first time range during a first time period, the first set of photons being emitted by a first series of optical pulses, each optical pulse of the first series of optical pulses having a first duration and the first set of photons being reflected from an object; at a step, 1904, grouping the photons of the first set of photons depending on times of flight of the photons of the first set of photons; at a step, 1906, determining a second time range based on the grouping of the photons of the first set of photons, the second time range being smaller than the first time range; at a step, 1908, detecting a second set of photons having times of flight that fall within the second time range during a second time period, the second set of photons being emitted by a second series of optical pulses, each optical pulse of the second series of optical pulses having a second duration that is less than the first duration and the first set of photons being reflected from the object; at a step, 1910, grouping the photons of the second set of photons depending on times of flight of the photons of the second set of photons; and at a step, 1912, determining a third time range based on the grouping of the photons of the second set of photons, the third time range being smaller than the second time range.

In various embodiments, the method 1900 may further comprise, wherein grouping the photons of the first set of photons comprises: dividing the first time range into a first subdivision, a second subdivision, a third subdivision, and a fourth subdivision; counting a number of photons having times of flight within the first subdivision; counting a number of photons having times of flight within the second subdivision; counting a number of photons having times of flight within the third subdivision; and counting a number of photons having times of flight within the fourth subdivision.

In various embodiments, the method 1900 may further comprise, wherein: counting the number of photons having times of flight within the first subdivision is performed with a first counter; counting a number of photons having times of flight within the second subdivision is performed with a second counter; counting a number of photons having times of flight within the third subdivision is performed with a third counter; and counting a number of photons having times of flight within the fourth subdivision is performed with a fourth counter.

In various embodiments, the method 1900 may further comprise, wherein determining the second time range based on the grouping of the photons of the first set of photons comprises: finding a first difference by subtracting the number of photons having times of flight within the second subdivision from the number of photons having times of flight within the first subdivision; finding a second difference by subtracting the number of photons having times of flight within the third subdivision from the number of photons having times of flight within the fourth subdivision; and identifying the second time range based on the first difference and the second difference.

In various embodiments, the method 1900 may further comprise, wherein the first subdivision comprises a first half of the first time range, the second subdivision comprises a second half of the first time range, the third subdivision comprises a first quadrant of the first time range and a last quadrant of the first time range, and the fourth subdivision comprises a second quadrant of the first time range and a third quadrant of the first time range.

In various embodiments, the method 1900 may further comprise, wherein the first series of optical pulses is emitted by an optical emitter.

In various embodiments, the method 1900 may further comprise, wherein the first set of photons and the second set of photons are detected by an optical receiver.

In various embodiments, the method 1900 may further comprise, wherein the first set of photons is used to center the second time range.

In various embodiments, the method 1900 may further comprise: determining a final time range based centered around a peak time interval based on a set of photons having times of flight that fall within a preceding time range; dividing the final time range into a first subdivision, a second subdivision, a third subdivision, and a fourth subdivision; detecting a final set of photons having times of flight that fall within the final time range and being detected during a final time period, the final set of photons being emitted by a final series of optical pulses, each optical pulse of the final series of optical pulses having a final duration; calculating a location of a peak photon position within the peak time interval based on a first photon count of photons of the final set of photons having times of flight falling within the first subdivision, a second photon count of photons of the set of photons having times of flight falling within the second subdivision, a third photon count of photons of the set of photons having times of flight falling within the third subdivision, and a fourth photon count of photons of the set of photons having times of flight within the fourth subdivision; and wherein the first subdivision comprises a first half of the final time range, the second subdivision comprises a second half of the final time range, the third subdivision comprises a first quadrant of the final time range and a last quadrant of the final time range, and the fourth subdivision comprises a second quadrant of the final time range and a third quadrant of the final time range.

Figure 20:
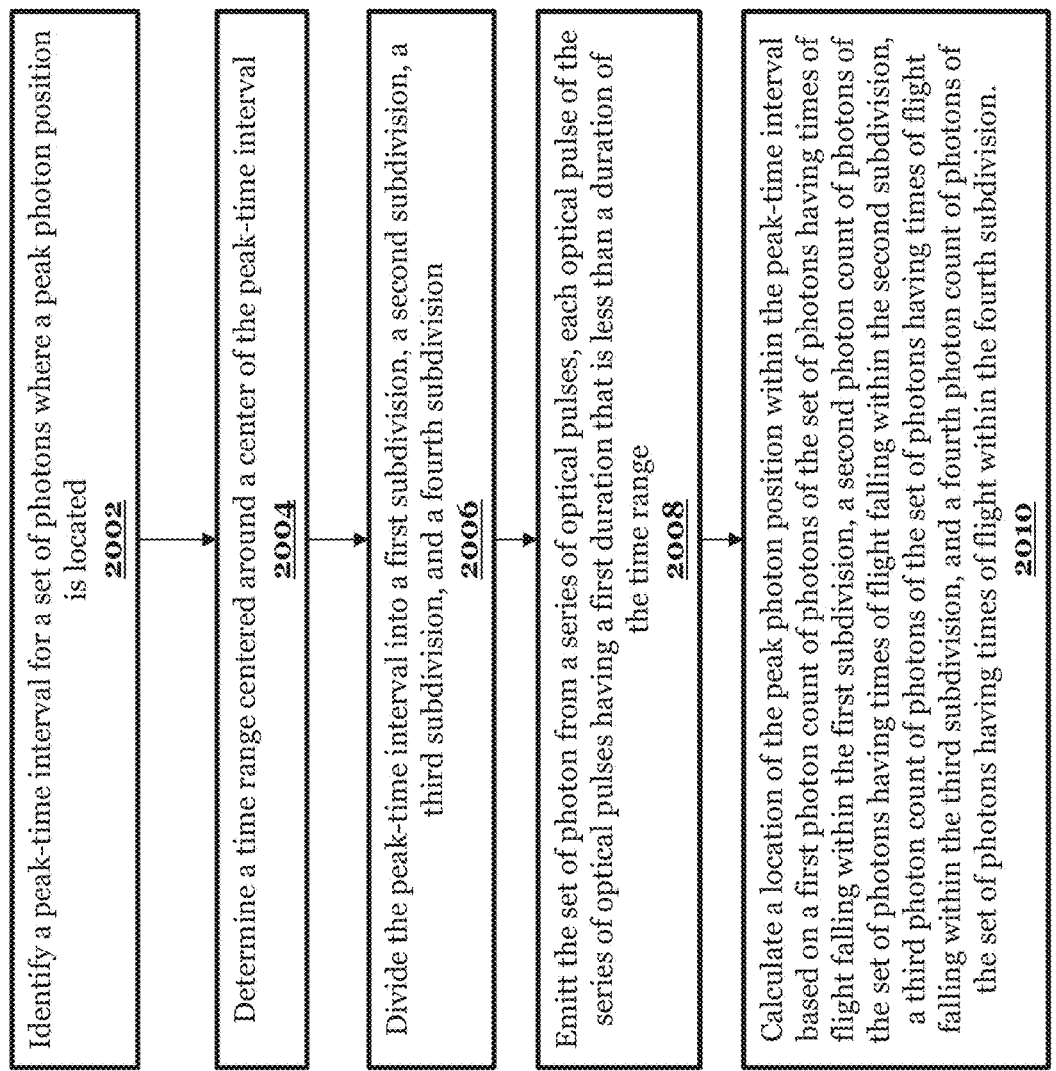
FIG. 20 depicts a flow chart illustrating a method in accordance with an embodiment

FIG. 20 depicts a flow chart illustrating a method 2000.

In various embodiments, the method 2000 may comprise: at a step 2002, identifying a peak-time interval for a set of photons where a peak photon position is located; at a step 2004, determining a time range centered around a center of the peak-time interval; at a step 2006, dividing the peak-time interval into a first subdivision, a second subdivision, a third subdivision, and a fourth subdivision; at a step 2008, emitting the set of photon from a series of optical pulses, each optical pulse of the series of optical pulses having a first duration that is less than a duration of the time range; and at a step 2010, calculating a location of the peak photon position within the peak-time interval based on a first photon count of photons of the set of photons having times of flight falling within the first subdivision, a second photon count of photons of the set of photons having times of flight falling within the second subdivision, a third photon count of photons of the set of photons having times of flight falling within the third subdivision, and a fourth photon count of photons of the set of photons having times of flight within the fourth subdivision.

In various embodiments, the method 2000 may further comprise, wherein the first subdivision comprises a first half of the time range, the second subdivision comprises a second half of the time range, the third subdivision comprises a first quadrant of the time range and a last quadrant of the time range, and the fourth subdivision comprises a second quadrant of the time range and a third quadrant of the time range.

In various embodiments, the method 2000 may further comprise, wherein calculating the location of the peak photon position within the peak-time interval comprises: taking an inverse tangent of a ratio of a difference between the first photon count and the second photon count and the difference between the third photon count and the fourth photon count; and subtracting a result of the inverse tangent from the center of the peak-time interval.

In various embodiments, the method 2000 may further comprise, wherein calculating the location of the peak photon position within the peak-time interval comprises: taking an inverse tangent of a ratio of a difference between the first photon count and the second photon count and the difference between the third photon count and the fourth photon count; finding that the difference between the third photon count and the fourth photon count is less than or equal to zero; adjusting a result of the inverse tangent; and subtracting a result of the inverse tangent from the center of the peak-time interval.

In various embodiments, the method 2000 may further comprise, wherein the peak-time interval is received from a radiation-sensitive pixel comprising a device for detecting peak time intervals.

In various embodiments, the method 2000 may further comprise, wherein the peak-time interval is identified by a processor that receives a time of flight histogram from a radiation-sensitive pixel.

In various embodiments, the method 2000 may further comprise, wherein the first duration is between 25% of the duration of the time range and 75% of the duration of the time range.

Example 1. A method includes: counting a first set of photons having times of flight that fall within a first time range and being detected during a first time period, the first set of photons being emitted by a first series of optical pulses, each optical pulse of the first series of optical pulses having a first duration; determining a second time range based on the first set of photons, the second time range being smaller than the first time range; counting a second set of photons having times of flight that fall within the second time range and being detected during a second time period, the second set of photons being emitted by a second series of optical pulses, each optical pulse of the second series of optical pulses having a second duration that is less than the first duration; and determining a third time range based on the second set of photons, the third time range being smaller than the second time range.

Example 2. The method of Example 1 further including, wherein the first series of optical pulses is emitted by an optical emitter.

Example 3. The method of Example 1 or Example 2 further including, wherein the first set of photons and the second set of photons are detected by an optical receiver.

Example 4. The method of Examples 1 to Example 3 further including, wherein the first set of photons is used to center the second time range.

Example 5. The method of Examples 1 to Example 4 further including, further determining a final time range based on a set of photons having times of flight that fall within a preceding time range and being detected during a preceding time period; counting a final set of photons having times of flight that fall within the final time range and being detected during a final time period, the final set of photons being emitted by a final series of optical pulses, each optical pulse of the final series of optical pulses having a final duration; and calculating a location of a peak photon position within the final time range based on the final set of photons.

Example 6. A method including: detecting a first set of photons having times of flight that fall within a first time range during a first time period, the first set of photons being emitted by a first series of optical pulses, each optical pulse of the first series of optical pulses having a first duration and the first set of photons being reflected from an object; grouping the photons of the first set of photons depending on times of flight of the photons of the first set of photons; determining a second time range based on the grouping of the photons of the first set of photons, the second time range being smaller than the first time range; detecting a second set of photons having times of flight that fall within the second time range during a second time period, the second set of photons being emitted by a second series of optical pulses, each optical pulse of the second series of optical pulses having a second duration that is less than the first duration and the first set of photons being reflected from the object; grouping the photons of the second set of photons depending on times of flight of the photons of the second set of photons; determining a third time range based on the grouping of the photons of the second set of photons, the third time range being smaller than the second time range.

Example 7. The method of Example 6, wherein grouping the photons of the first set of photons comprises: dividing the first time range into a first subdivision, a second subdivision, a third subdivision, and a fourth subdivision; counting a number of photons having times of flight within the first subdivision; counting a number of photons having times of flight within the second subdivision; counting a number of photons having times of flight within the third subdivision; and counting a number of photons having times of flight within the fourth subdivision.

Example 8. The method of Example 6 or Example 7, wherein: counting the number of photons having times of flight within the first subdivision is performed with a first counter; counting a number of photons having times of flight within the second subdivision is performed with a second counter; counting a number of photons having times of flight within the third subdivision is performed with a third counter; and counting a number of photons having times of flight within the fourth subdivision is performed with a fourth counter.

Example 9. The method of Example 6 to Example 8, wherein determining the second time range based on the grouping of the photons of the first set of photons comprises: finding a first difference by subtracting the number of photons having times of flight within the second subdivision from the number of photons having times of flight within the first subdivision; finding a second difference by subtracting the number of photons having times of flight within the third subdivision from the number of photons having times of flight within the fourth subdivision; and identifying the second time range based on the first difference and the second difference.

Example 10. The method of Example 6 to Example 9, wherein the first subdivision includes a first half of the first time range, the second subdivision includes a second half of the first time range, the third subdivision includes a first quadrant of the first time range and a last quadrant of the first time range, and the fourth subdivision includes a second quadrant of the first time range and a third quadrant of the first time range.

Example 11. The method of Example 6 to Example 10, wherein the first series of optical pulses is emitted by an optical emitter.

Example 12. The method of Example 6 to Example 11, wherein the first set of photons and the second set of photons are detected by an optical receiver.

Example 13. The method of Example 6 to Example 12, wherein the first set of photons is used to center the second time range.

Example 14. The method of Example 6 to Example 13 further including: determining a final time range based centered around a peak time interval based on a set of photons having times of flight that fall within a preceding time range; dividing the final time range into a first subdivision, a second subdivision, a third subdivision, and a fourth subdivision; detecting a final set of photons having times of flight that fall within the final time range and being detected during a final time period, the final set of photons being emitted by a final series of optical pulses, each optical pulse of the final series of optical pulses having a final duration; calculating a location of a peak photon position within the peak time interval based on a first photon count of photons of the final set of photons having times of flight falling within the first subdivision, a second photon count of photons of the set of photons having times of flight falling within the second subdivision, a third photon count of photons of the set of photons having times of flight falling within the third subdivision, and a fourth photon count of photons of the set of photons having times of flight within the fourth subdivision; and wherein the first subdivision comprises a first half of the final time range, the second subdivision comprises a second half of the final time range, the third subdivision comprises a first quadrant of the final time range and a last quadrant of the final time range, and the fourth subdivision comprises a second quadrant of the final time range and a third quadrant of the final time range.

Example 15. A device to detect a peak time interval, the device comprising: a first counter configured to increment a first count each time a first-counter increment command is received, the first counter being configured to decrement the first count each time a first-counter decrement command is received; a gate circuit configured to receive a photon-detection alert from a radiation-sensitive pixel each time a photon is detected by the radiation-sensitive pixel, the gate circuit comprising a first state wherein the gate circuit transmits the first-counter increment command to the first counter each time the photon-detection alert is received and the gate circuit comprising a second state wherein the gate circuit transmits the first-counter decrement command to the first counter each time the photon-detection alert is received; and a decoder circuit configured to receive the first count from the first counter and configured to receive a timing signal that communicates an optical-emission time by an optical emitter wherein the decoder circuit is configured to deliver a control signal to the gate circuit that: sets the gate circuit to the first state after passage of a first-state delay that is determined based on the first count and measured from the optical-emission time; and sets the gate circuit to the second state after passage of a second-state delay that is determined based on the first count and measured from the optical-emission time.

Example 16. The Example of claim 15, further comprising: a second counter configured to increment a second count each time a second-counter increment command is received, the second counter being configured to decrement the second count each time a second-counter decrement command is received; the gate circuit comprises a third state wherein the gate circuit transmits the second-counter increment command to the second counter each time the photon-detection alert is received and the gate circuit comprising a fourth state wherein the gate circuit transmits the second-counter decrement command to the second counter each time the photon-detection alert is received; and wherein the control signal sets the gate circuit to the third state after passage of a third-state delay that is determined based on the second count and the first count, the third-state delay being measured from the time of the optical-emission time; and wherein the control signal sets the gate circuit to the fourth state after passage of a fourth-state delay that is determined based on the second count and the first count, the fourth-state delay being measured from the time of the optical-emission time.

Example 17. The device of Example 15 to Example 16, wherein the first-state delay is further determined by the second count and the second-state delay is further determined by the second count.

Example 18. The device of Example 15 to Example 17, wherein the decoder circuit is configured to receive a global-step signal that determines: a duration of a first-state period wherein the gate circuit is set to the first state; a duration of a second-state period wherein the gate circuit is set to the second state; a duration of a third-state period wherein the gate circuit is set to the third state; and a duration of a fourth-state period wherein the gate circuit is set to the fourth state.

Example 19. The device of Example 15 to Example 18, wherein the radiation-sensitive pixel comprises a Single Photon Avalanche Diode.

Example 20. A method may comprise: identifying a peak-time interval for a set of photons where a peak photon position is located; determining a time range centered around a center of the peak-time interval; dividing the peak-time interval into a first subdivision, a second subdivision, a third subdivision, and a fourth subdivision; emitting the set of photon from a series of optical pulses, each optical pulse of the series of optical pulses having a first duration that is less than a duration of the time range; calculating a location of the peak photon position within the peak-time interval based on a first photon count of photons of the set of photons having times of flight falling within the first subdivision, a second photon count of photons of the set of photons having times of flight falling within the second subdivision, a third photon count of photons of the set of photons having times of flight falling within the third subdivision, and a fourth photon count of photons of the set of photons having times of flight within the fourth subdivision.

Example 21. The method of Example 20, wherein the first subdivision comprises a first half of the time range, the second subdivision comprises a second half of the time range, the third subdivision comprises a first quadrant of the time range and a last quadrant of the time range, and the fourth subdivision comprises a second quadrant of the time range and a third quadrant of the time range.

Example 22. The method of Example 20 or Example 21, wherein calculating the location of the peak photon position within the peak-time interval comprises: taking an inverse tangent of a ratio of a difference between the first photon count and the second photon count and the difference between the third photon count and the fourth photon count; and subtracting a result of the inverse tangent from the center of the peak-time interval.

Example 23. The method of Example 20 to Example 22, wherein calculating the location of the peak photon position within the peak-time interval comprises: taking an inverse tangent of a ratio of a difference between the first photon count and the second photon count and the difference between the third photon count and the fourth photon count; finding that the difference between the third photon count and the fourth photon count is less than or equal to zero; adjusting a result of the inverse tangent; and subtracting a result of the inverse tangent from the center of the peak-time interval.

Example 24. The method of Example 20 to Example 23, wherein the peak-time interval is received from a radiation-sensitive pixel comprising a device for detecting peak time intervals.

Example 25. The method of Example 20 to Example 24, wherein the peak-time interval is identified by a processor that receives a time of flight histogram from a radiation-sensitive pixel.

Example 26. The method of Example 20 to Example 25, wherein the first duration is between 25% of the duration of the time range and 75% of the duration of the time range.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device to detect a peak time interval, the device comprising:
a first counter configured to increment a first count each time a first-counter increment command is received, the first counter being configured to decrement the first count each time a first-counter decrement command is received;
a gate circuit configured to receive a photon-detection alert from a radiation-sensitive pixel each time a photon is detected by the radiation-sensitive pixel, the gate circuit comprising a first state wherein the gate circuit transmits the first-counter increment command to the first counter each time the photon-detection alert is received and the gate circuit comprising a second state wherein the gate circuit transmits the first-counter decrement command to the first counter each time the photon-detection alert is received; and
a decoder circuit configured to receive the first count from the first counter and configured to receive a timing signal that communicates an optical-emission time by an optical emitter wherein the decoder circuit is configured to deliver a control signal to the gate circuit that:
sets the gate circuit to the first state after passage of a first-state delay that is determined based on the first count and measured from the optical-emission time; and
sets the gate circuit to the second state after passage of a second-state delay that is determined based on the first count and measured from the optical-emission time.

2. The device of claim 1, further comprising:
a second counter configured to increment a second count each time a second-counter increment command is received, the second counter being configured to decrement the second count each time a second-counter decrement command is received;
the gate circuit comprises a third state wherein the gate circuit transmits the second-counter increment command to the second counter each time the photon-detection alert is received and the gate circuit comprising a fourth state wherein the gate circuit transmits the second-counter decrement command to the second counter each time the photon-detection alert is received; and
wherein the control signal sets the gate circuit to the third state after passage of a third-state delay that is determined based on the second count and the first count, the third-state delay being measured from the time of the optical-emission time; and
wherein the control signal sets the gate circuit to the fourth state after passage of a fourth-state delay that is determined based on the second count and the first count, the fourth-state delay being measured from the time of the optical-emission time.

3. The device of claim 2, wherein the first-state delay is further determined by the second count and the second-state delay is further determined by the second count.

4. The device of claim 3, wherein the decoder circuit is configured to receive a global-step signal that determines:
a duration of a first-state period wherein the gate circuit is set to the first state;
a duration of a second-state period wherein the gate circuit is set to the second state;
a duration of a third-state period wherein the gate circuit is set to the third state; and
a duration of a fourth-state period wherein the gate circuit is set to the fourth state.

5. The device of claim 1, wherein the radiation-sensitive pixel comprises a Single Photon Avalanche Diode.

6. The device of claim 1, wherein the radiation-sensitive pixel comprises a Single Photon Avalanche Diode (SPAD) coupled to an OR tree.

7. The device of claim 1, further comprising a processor configured to perform the time-of-flight operation.

8. A method for detecting a peak time interval in a time-of-flight system, the method comprising:

incrementing, by a first counter, a first count in response to receiving a first-counter increment command;

decrementing, by the first counter, the first count in response to receiving a first-counter decrement command;

receiving, by a gate circuit, a photon-detection alert from a radiation-sensitive pixel in response to detecting a photon by the radiation-sensitive pixel, the gate circuit having a first state wherein the gate circuit transmits the first-counter increment command to the first counter in response to receiving the photon-detection alert, and the gate circuit having a second state wherein the gate circuit transmits the first-counter decrement command to the first counter in response to receiving the photon-detection alert;

receiving, by a decoder circuit, the first count from the first counter;

receiving, by the decoder circuit, a timing signal that communicates an optical-emission time by an optical emitter;

transmitting, by the decoder circuit, a control signal to the gate circuit;

setting the gate circuit to the first state after a passage of a first-state delay determined in accordance with the first count and measured from the optical-emission time; and setting the gate circuit to the second state after a passage of a second-state delay determined in accordance with the first count and measured from the optical-emission time.

9. The method of claim 8, further comprising:

incrementing, by a second counter, a second count in response to receiving a second-counter increment command;

decrementing, by the second counter, the second count in response to receiving a second-counter decrement command;

transmitting, by the gate circuit in a third state, the second-counter increment command to the second counter in response to receiving the photon-detection alert;

transmitting, by the gate circuit in a fourth state, the second-counter decrement command to the second counter in response to receiving the photon-detection alert;

setting the gate circuit to the third state by the control signal after a passage of a third-state delay determined in accordance with the second count and the first count, the third-state delay measured from the time of the optical-emission time; and setting the gate circuit to the fourth state by the control signal after a passage of a fourth-state delay determined in accordance with the second count and the first count, the fourth-state delay measured from the time of the optical-emission time.

10. The method of claim 9, wherein the first-state delay is further determined by the second count, and wherein the second-state delay is determined by the second count.

11. The method of claim 10, further comprising receiving, by the decoder circuit, a global-step signal, the global-step signal determining a duration of a first-state period wherein the gate circuit is set to the first state, a duration of a second-state period wherein the gate circuit is set to the second state, a duration of a third-state period wherein the gate circuit is set to the third state, and a duration of a fourth-state period wherein the gate circuit is set to the fourth state.

12. The method of claim 8, wherein the radiation-sensitive pixel comprises a Single Photon Avalanche Diode.

13. The method of claim 8, wherein the radiation-sensitive pixel comprises a Single Photon Avalanche Diode (SPAD) coupled to an OR tree.

14. The method of claim 8, further comprising detecting a distance from an object based on time-of-flight.

15. A time-of-flight system, comprising:

an optical emitter configured to emit photons;

an optical receiver comprising a radiation-sensitive pixel;

a first counter configured to increment a first count in response to receiving a first-counter increment command, the first counter configured to decrement the first count in response to receiving a first-counter decrement command;

a gate circuit configured to receive a photon-detection alert from the radiation-sensitive pixel in response to detecting a photon by the radiation-sensitive pixel, the gate circuit comprising a first state and a second state, wherein the gate circuit transmits the first-counter increment command to the first counter in response to receiving the photon-detection, and wherein the gate circuit transmits the first-counter decrement command to the first counter in response to receiving the photon-detection alert; and a decoder circuit configured to receive the first count from the first counter and a timing signal that communicates an optical-emission time by the optical emitter, wherein the decoder circuit is configured to deliver a control signal to the gate circuit that:

sets the gate circuit to the first state after a passage of a first-state delay determined based on the first count and measured from the optical-emission time; and sets the gate circuit to the second state after a passage of a second-state delay determined based on the first count and measured from the optical-emission time.

16. The time-of-flight system of claim 15, further comprising:

a second counter configured to increment a second count each time a second-counter increment command is received, the second counter being configured to decrement the second count each time a second-counter decrement command is received; and the gate circuit comprising a third state and a fourth state, wherein the gate circuit transmits the second-counter increment command to the second counter in response to receiving the photon-detection alert, and wherein the gate circuit transmits the second-counter decrement command to the second counter in response to receiving the photon-detection alert, wherein the control signal sets the gate circuit to the third state after a passage of a third-state delay determined in accordance with the second count and the first count, the third-state delay measured from the time of the optical-emission time, and wherein the control signal sets the gate circuit to the fourth state after a passage of a fourth-state delay determined in accordance with the second count and the first count, the fourth-state delay measured from the time of the optical-emission time.

17. The time-of-flight system of claim 16, wherein the first-state delay is further determined by the second count, and wherein the second-state delay is further determined by the second count.

18. The time-of-flight system of claim 17, wherein the decoder circuit is configured to receive a global-step signal that determines:

a duration of a first-state period wherein the gate circuit is set to the first state;

a duration of a second-state period wherein the gate circuit is set to the second state;

a duration of a third-state period wherein the gate circuit is set to the third state; and a duration of a fourth-state period wherein the gate circuit is set to the fourth state.

19. The time-of-flight system of claim 16, wherein the radiation-sensitive pixel comprises a Single Photon Avalanche Diode.

20. The time-of-flight system of claim 16, wherein the radiation-sensitive pixel comprises a Single Photon Avalanche Diode (SPAD) coupled to an OR tree.

21. The time-of-flight system of claim 16, further comprising a processor configured to perform the time-of-flight operation.

22. A method for detecting a peak time interval in a time-of-flight system, the method comprising:

incrementing a first count in response to a first-counter increment command;

decrementing the first count in response to a first-counter decrement command;

detecting a photon by a radiation-sensitive pixel, wherein, in a first state, the first-counter increment command is generated in response to the detecting, and wherein, in a second state, the first-counter decrement command is generated in response to the detecting;

receiving a timing signal that communicates an optical-emission time by an optical emitter;

transmitting a control signal;

setting the time-of-flight system to the first state after a passage of a first-state delay determined in accordance with the first count and measured from the optical-emission time; and setting the time-of-flight system to the second state after a passage of a second-state delay determined in accordance with the first count and measured from the optical-emission time.

23. The method of claim 22, further comprising:

incrementing a second count in response to a second-counter increment command;

decrementing the second count in response to a second-counter decrement command;

generating, in a third state, the second-counter increment command in response to the detecting;

generating, in a fourth state, the second-counter decrement command in response to the detecting;

setting the time-of-flight system to the third state by the control signal after a passage of a third-state delay determined in accordance with the second count and the first count, the third-state delay measured from the time of the optical-emission time; and setting the time-of-flight system to the fourth state by the control signal after a passage of a fourth-state delay determined in accordance with the second count and the first count, the fourth-state delay measured from the time of the optical-emission time.

24. The method of claim 23, wherein the first-state delay is further determined by the second count, and wherein the second-state delay is determined by the second count.

25. The method of claim 24, further comprising receiving a global-step signal, the global-step signal determining a duration of a first-state period wherein the time-of-flight system is set to the first state, a duration of a second-state period wherein the time-of-flight system is set to the second state, a duration of a third-state period wherein the time-of-flight system is set to the third state, and a duration of a fourth-state period wherein the time-of-flight system is set to the fourth state.

26. The method of claim 22, wherein the radiation-sensitive pixel comprises a Single Photon Avalanche Diode.

* * * * *